US006056556A

United States Patent [19]
Braun et al.

[11] Patent Number: 6,056,556
[45] Date of Patent: May 2, 2000

[54] COMPUTER-BASED SIMULATION EXAMINATION OF ARCHITECTURAL PRACTICE

[75] Inventors: Henry I. Braun, Lawrenceville; Peter D. Brittingham, Titusville; Isaac I. Bejar, Trenton; Clark L Chalifour, Lawrenceville; Richard N. Devore, Stockton; Anne S. Hone, Pennington; Dennis C. Quardt, Parsippany; Robert L. Rarich, Titusville; Keith S. Reid-Green, Pennington; Harriet P. Trenholm, Monmouth Junction; Daniel I. Zuckerman, Princeton, all of N.J.

[73] Assignee: Educational Testing Service, Princeton, N.J.

[21] Appl. No.: 08/811,890

[22] Filed: Mar. 5, 1997

[51] Int. Cl.[7] .................................................. G09B 7/00
[52] U.S. Cl. ........................ 434/323; 434/327; 434/350; 345/133
[58] Field of Search .................................... 434/118, 219, 434/169, 185, 307 R, 308, 322, 323, 234, 350, 362, 327; 345/133, 348, 349; 706/927, 915; 707/102

[56] References Cited

U.S. PATENT DOCUMENTS

| | | | |
|---|---|---|---|
| 4,867,685 | 9/1989 | Brush et al. | 434/234 |
| 4,895,518 | 1/1990 | Arnold et al. | 434/118 |
| 5,011,413 | 4/1991 | Ferris et al. | |
| 5,059,127 | 10/1991 | Lewis et al. | |
| 5,204,813 | 4/1993 | Samph et al. | 434/350 X |
| 5,211,564 | 5/1993 | Martinez et al. | 345/133 X |
| 5,306,154 | 4/1994 | Ujita et al. | 706/915 X |
| 5,326,270 | 7/1994 | Ostby et al. | 706/927 X |
| 5,565,316 | 10/1996 | Kershaw et al. | |
| 5,829,983 | 11/1998 | Koyama et al. | 707/102 X |

OTHER PUBLICATIONS

Michael E. Martinez, John J. Ferris, William Kraft and Winton H. Manning, "Automatic Scoring of Paper–and–Pencil Figural Responses", Oct. 1990, Research Report (RR–90–23), Educational Testing Service, Princeton, N.J.

*Primary Examiner*—Joe H. Cheng
*Attorney, Agent, or Firm*—Michael I. Chakansky

[57] ABSTRACT

The present invention relates to computer-based technology in assessment particularly for the licensing and certification of professionals such as architects and engineers. For assessment of architects, the system includes tools and methods for item creation, computer programs for computerized item presentation, and programs for automatically scoring test responses by computer.

53 Claims, 70 Drawing Sheets

| | |
|---|---|
| Feature: | F1: Entry Door Width--applies only to HC accessible toilet rooms. |
| Possible Values: | A, I, U |
| Multiplier: | 2 |
| Rule: | A: All entry doors are 32 to 40 inches wide. |
| | I: One or more entry doors are 30 or 42 inches wide. |
| | U: Anything else. |
| Method: | |
| Comment: | Individual toilet rooms may have more than one entry door. They must all satisfy this requirement. |
| Question: | |

FIG. 12

| | |
|---|---|
| Feature: | F1a: Entry Door Width: Non-accessible Toilet Rooms. |
| Possible Values: | A, I, U |
| Multiplier: | 2 |
| Rule: | A: All entry doors to Non-HC toilet rooms are 24" or greater. |
| | I: One or more 22" wide. |
| | U: Anything else. |
| Method: | |
| Comment: | Individual toilet rooms may have more than one entry door. They must all satisfy this requirement. |
| Question: | |

FIG. 13

| | |
|---|---|
| Feature: | F2: Latch Clearance |
| Possible Values: | A, I, U |
| Multiplier: | 1 |
| Rule: | In toilet rooms that are author-specified HC accessible, all doors meet the following requirements:<br><br>A: Conforms to code from both the push and pull side of the door<br><br>I: One or more 2" off.<br><br>U: Anything else. |
| Method: | On the latch side of a door, a wall or other obstruction may not be within 18" on the pull side and 12□ on the push side. |

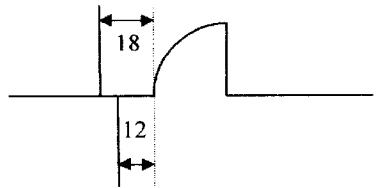

| | |
|---|---|
| Comment: | |
| Question: | |

FIG. 14

| | |
|---|---|
| Feature: | F3: Virtual Clearance |
| Possible Values: | A, I, U |
| Multiplier: | 1 |
| Rule: | In toilet rooms that are author-specified HC accessible, all doors meet the following requirements:<br><br>A: Conforms to code from both the push and pull side of the door. (60 pull side, 48 push side).<br><br>I: One or more 2" off (58 pull side or 46 pull side).<br><br>U: Anything else. |
| Method: | On the latch side of a door, a perpendicular wall or other obstruction may not be within 60" on the pull side and 48" on the push side. |

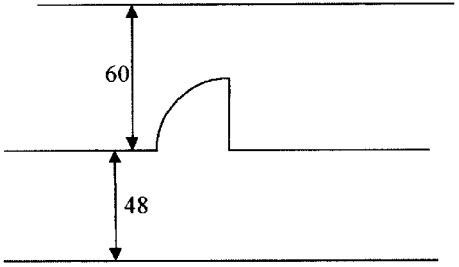

Comment:

Question:

FIG. 15

| | |
|---|---|
| Feature: | F3a: Two Doors in Series (New Feature) Same as for C5 (Ramp).<br>For accessible toilet rooms only. |
| Possible Values: | A, I, U |
| Multiplier: | 1 |
| Rule: | |
| | A: |
| | I: |
| | U: Anything else. |
| Method: | |
| Comment: | |
| Question: | |

FIG. 16

| | |
|---|---|
| Feature: | F5: Encroachment, HC Lavatory |
| Possible Values: | A, I, U |
| Multiplier: | 2 |
| Rule: | All HC lavatories must have: |
| | A: A minimum 30 x 48" non-encroachment zone. |
| | I: One or more length and/or width of zone is 2" too small. |
| | U: Anything else. |
| Method: | No object may encroach on the zone as shown below. The door swing may encroach! |

| | |
|---|---|
| Comment: | |
| Question: | |

| | |
|---|---|
| Feature: | F6: Encroachment, HC Urinal |
| Possible Values: | A, I, U |
| Multiplier: | 2 |
| Rule: | All HC urinals must have: |
| | A: A minimum 30 x 48" zone. |
| | I: One or more with length and/or width of zone is 2" too small. |
| | U: Anything else. |
| Method: | No object may encroach on the zone as shown below. The door swing may encroach! |

Comment:

Question:

Feature: F7: Encroachment, HC Amenity

Possible Values: A, I, U

Multiplier: 2

Rule: HC amenity (either a shower or an infant changing table) must have:

Infant Changing Table

A: A minimum 3" x 4" zone

I: Length and/or width of zone is 2" too small

U: Anything else.

Roll-in Shower Stall

A: A 3' x 5' encroachment zone that abuts the shower door.

I: Length and/or width of zone is 2" too small.

U: Anything else.

Method:

Shower: No object may encroach on the zone as shown below. Door swings may encroach.

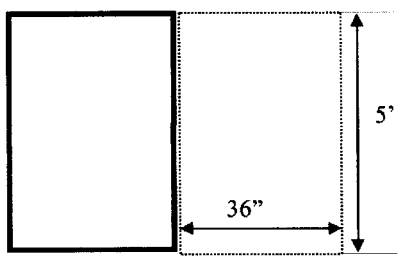

Changing Table: No object may encroach on the zone as shown below. Door swings may encroach.

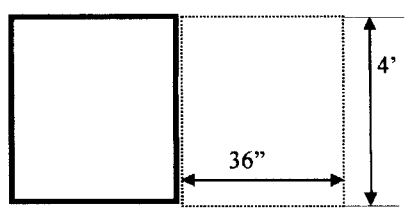

FIG. 20

| | |
|---|---|
| Feature: | F8: Side Grab Bar Location |
| Possible Values: | A, I, U |
| Multiplier: | 1 |
| Rule: | A: Side grab bars are drawn for HC water closets and are located on the side wall of the stall within 12" of the wall behind the WC.<br><br>I: One or more within 14".<br><br>U: Anything else. |
| Method: |  |
| Comment: | |
| Question: | |

| | |
|---|---|
| Feature: | F9: Rear Grab Bar Location |
| Possible Values: | A, I, U |
| Multiplier: | 1 |
| Rule: | A: All rear grab bars are drawn for all HC water closets and are located on the wall behind the WC and up to 6" from the nearest side wall. |
| | I: One or more within 8". |
| | U: Anything else. |
| Method: |  |
| Comment: | |
| Question: | |

| | |
|---|---|
| Feature: | F10: Encroachment, Non-Accessible Water Closet Stall |
| Possible Values: | A, I, U |
| Multiplier: | 2 |
| Rule: | All Non-HC water closets must have: |
| | A: A minimum of 30" wide and 54" deep. A: |
| | I: One or more stalls 2" too narrow and/or too shallow. |
| | U: Anything else. |
| Method: |  |
| Comment: | |
| Question: | |

| | |
|---|---|
| Feature: | F11: Encroachment, Lavatory |
| Possible Values: | A, I, U |
| Multiplier: | 2 |
| Rule: | All Non-HC lavatories must have: |
| | A: A minimum 30 x 30" non-encroachment zone. |
| | I: One or more length and/or width of zone is 2" too small. |
| | U: Anything else. |
| Method: | No object may encroach on the zone as shown below. Door swings may encroach. |

Comment:

Question:

| | |
|---|---|
| Feature: | F12: Encroachment, Urinal |
| Possible Values: | A, I, U |
| Multiplier: | 2 |
| Rule: | All Non-HC urinals must have:<br><br>A: A minimum 30 x 30" non-encroachment zone.<br><br>I: One or more length and/or width of zone is 2" too small.<br><br>U: Anything else. |
| Method: | No object may encroach on the zone as shown below. Door swings may encroach. |

Comment:

Question:

| | |
|---|---|
| Feature: | F13: Travel Path Width |
| Possible Values: | A, I, U |
| Multiplier: | 1 |
| Rule: | A: Travel paths from every entry door of a toilet room must maintain a minimum width of 36" to each fixture in that toilet room. |
| | I: A minimum width of 30" is maintained. |
| | U: Anything else. |
| Method: | |
| Comment: | |
| Question: | |

FIG. 26

| | |
|---|---|
| Feature: | F14: Turning Radius |
| Possible Values: | A, I, U |
| Multiplier: | 1 |
| Rule: | In toilet rooms that are author-specified HC accessible:<br><br>A: A turning circle of a minimum of 60" in diameter must exist somewhere within the toilet room, and must be connected to the travel path.<br><br>I: 58".<br><br>U: Anything else. |
| Method: | |
| Comment: | |
| Question: | |

FIG. 27

| | |
|---|---|
| Feature: | F15: View |
| Possible Values: | A, I, U |
| Multiplier: | 1 |
| Rule: | A: For all rooms, the view cone includes no stall doors or urinals. |
| | I: For one or more rooms the view cone includes one or more stall doors but no urinals. |
| | U: For one or more rooms the view cone includes one or more urinals. |
| Method: | The view cone is everything that can be seen walking past the door. An outswinging door in the open position (shown below) may itself screen the view somewhat. |

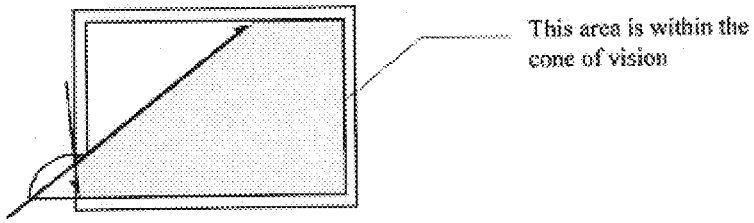

This area is within the cone of vision

Comment:

Question:

FIG. 28

| | |
|---|---|
| Feature: | F16: Wall Thickness |
| Possible Values: | A, U |
| Multiplier: | 1 |
| Rule: | A: All water closets, and urinals should abut 8" walls for their full width. |
| | U: One or more do not. |
| Method: | |
| Comment: | The candidate can "thicken" the existing 4" walls by using the wall tool to increase the thickness to 8" (or more). |
| Question: | |

FIG. 29

| | |
|---|---|
| Feature: | F17: Fixtures / Wall Relationship |
| Possible Values: | A, I, U |
| Multiplier: | 1 |
| Rule: | A: All fixtures are located on or within 2" of the wall. |
| | I: One or more fixtures are 4" from the wall or 2" into the wall. |
| | U: Anything else. |
| Method: | |
| Comment: | |
| Question: | |

FIG. 30

| | |
|---|---|
| Feature: | F18: Room Placement |
| Possible Values: | A, F |
| Multiplier: | fatal |
| Rule: | A: All toilet rooms are configured within footprint. |
| | F: Anything else. |
| Method: | |
| Comment: | |
| Question: | |

FIG. 31

| | |
|---|---|
| Feature: | F19: Toilet Room Designed |
| Possible Values: | A, F |
| Multiplier: | fatal |
| Rule: | A: All prescribed toilet rooms are designed. |
| | F: Anything else. |
| Method: | A toilet room is considered designed if it is enclosed, it is accessible from public space, and it is labeled with a single label. |
| Comment: | |
| Question: | |

FIG. 32

| | |
|---|---|
| Feature: | F20: Water Closet Stalls Drawn |
| Possible Values: | A, F |
| Multiplier: | fatal |
| Rule: | A: All water closets are enclosed in stalls with one door 24" wide or wider. |
| | F: Anything else. |
| Method: | |
| Comment: | |
| Question: | |

FIG. 33

| | |
|---|---|
| Feature: | F21: Room Configuration |
| Possible Values: | A, F |
| Multiplier: | fatal |
| Rule: | A: Each toilet room must have the prescribed fixtures (HC and non-HC water closets, urinals and lavatories, and shower or infant changing table). |
| | F: Anything else. |
| Method: | |
| Comment: | |
| Question: | |

FIG. 34

M1: Master

| Composed of: | Matrices/features | Multiplier | Possible Values |
|---|---|---|---|
| | M2 Entry Door | 1 | AIU |
| | M3 Handicapped Features | 2 | AIU |
| | M5 Other Fixtures | 1 | AIU |
| | M6 Travel Path | 2 | AIU |
| | M7 Design Logic | 1 | AIU |

U's

| M1 | 0 | 1 | 2 | 3 | 4 | 5 | 6 | 7 | 8 | 9 | 10 |
|---|---|---|---|---|---|---|---|---|---|---|---|
| 0 | A | A | I | I | U | | | | | | |
| 1 | A | A | I | U | | | | | | | |
| 2 | A | I | I | U | | | | | | | |
| 3 | A | I | I | U | | | | | | | |
| 4 | I | I | U | U | | | | | | | |
| 5 | I | U | U | | | | | | | | |
| 6 | U | | | | | | | | | | |
| 7 | | | | | | | | | | | |
| 8 | | | | | | | | | | | |
| 9 | | | | | | | | | | | |
| 10 | | | | | | | | | | | |

I's (row label)

FIG. 35

M2: Entry Door

| Composed of: | Matrices/features | Multiplier | Possible Values |
|---|---|---|---|
| | F1 Width | 2 | AIU |
| | F2 Latch Clearance | 1 | AIU |
| | F3 Virtual Clearance | 1 | AIU |

U's

| M2 | 0 | 1 | 2 | 3 | 4 | 5 | 6 | 7 | 8 | 9 | 10 |
|---|---|---|---|---|---|---|---|---|---|---|---|
| 0 | A | I | U | | | | | | | | |
| 1 | A | I | U | | | | | | | | |
| 2 | I | U | | | | | | | | | |
| 3 | U | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

M3: Handicapped Fixtures

| Composed of: | Matrices/features | Multiplier | Possible Values |
|---|---|---|---|
| | F4 Encroachment - WC | 2 | AIU |
| | F5 Encroachement - Lavatory | 2 | AIU |
| | F6 Encroachment - Urinal | 2 | AIU |
| | F7 Encroachment - Amenity | 2 | AIU |
| | M4 Grab Bar | 1 | AIU |

U's

| M3 | 0 | 1 | 2 | 3 | 4 | 5 | 6 | 7 | 8 | 9 | 10 |
|---|---|---|---|---|---|---|---|---|---|---|---|
| 0 | A | A | I | I | U | | | | | | |
| 1 | A | | I | | U | | | | | | |
| 2 | A | I | I | I | U | | | | | | |
| 3 | I | | I | | U | | | | | | |
| 4 | I | I | U | | | | | | | | |
| 5 | I | U | | | | | | | | | |
| 6 | I | U | | | | | | | | | |
| 7 | U | | | | | | | | | | |
| 8 | | | | | | | | | | | |
| 9 | | | | | | | | | | | |
| 10 | | | | | | | | | | | |

I's (row label)

FIG. 37

M4: Grab Bar

| Composed of: | Matrices/features | Multiplier | Possible Values |
|---|---|---|---|
| | F8 Side Grab Bar | 1 | AIU |
| | F9 Rear Grab Bar | 1 | AIU |

U's

I's

| M4 | 0 | 1 | 2 | 3 | 4 | 5 | 6 | 7 | 8 | 9 | 10 |
|---|---|---|---|---|---|---|---|---|---|---|---|
| 0 | A | I | U | | | | | | | | |
| 1 | I | U | | | | | | | | | |
| 2 | U | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

FIG. 38

M5: Other Fixtures

| Composed of: | Matrices/features | Multiplier | Possible Values |
|---|---|---|---|
| | F10 Encroachment - WC | 1 | AIU |
| | F11 Encroachment - Lavatory | 1 | AIU |
| | F12 Encroachment - Urinal | 1 | AIU |

U's

| M5 | 0 | 1 | 2 | 3 | 4 | 5 | 6 | 7 | 8 | 9 | 10 |
|---|---|---|---|---|---|---|---|---|---|---|---|
| 0 | A | I | U | | | | | | | | |
| 1 | A | U | | | | | | | | | |
| 2 | I | U | | | | | | | | | | |
| 3 | U | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

M6: Travel Path

| Composed of: | Matrices/features | Multiplier | Possible Values |
|---|---|---|---|
| | F13 Width | 1 | AU |
| | F14 Turning Radius | 1 | AIU |

U's

| M6 | 0 | 1 | 2 | 3 | 4 | 5 | 6 | 7 | 8 | 9 | 10 |
|---|---|---|---|---|---|---|---|---|---|---|---|
| 0 | A | I | U | | | | | | | | |
| 1 | I | U | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

M7: Design Logic

| Composed of: | Matrices/features | Multiplier | Possible Values |
|---|---|---|---|
| | F15 View | 1 | AIU |
| | F16 Wall Thickness | 1 | AU |
| | F17 Fixtures / Wall Relationship | 1 | AIU |

U's

| M7 | 0 | 1 | 2 | 3 | 4 | 5 | 6 | 7 | 8 | 9 | 10 |
|---|---|---|---|---|---|---|---|---|---|---|---|
| 0 | A | I | U | | | | | | | | |
| 1 | A | U | | | | | | | | | |
| 2 | I | U | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

The 4" wall is drawn in the following way:

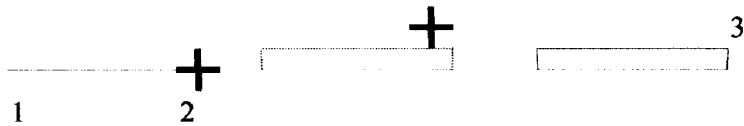

The endpoint of that line is fixed by click
2. When the cursor is moved perpendicularly
to the line (above or below), 3 dotted lines
show the candidate the wall that will be
formed. The wall should be the length of the
rubberbanding line, and 4" in width,
regardless of how far the cursor is Click #1
starts a rubberbanding line. moved from the
line. Click #3 completes the wall. Allow an
unlimited number to be drawn.

FIG. 42

> In order to ensure precision and accuracy of measurement, each vignette type is intended to assess a limited set of design skills, knowledges, and abilities. As you solve the problems posed by the vignettes, therefore, you will be asked to focus on specific design issues rather than to confront all of the design issues that a particular problem might represent.
>
> You should read the directions given for each vignette carefully in order to familiarize yourself with the scope of the vignette and the nature of the problem that it presents. In order to give yourself the best opportunity to demonstrate your ability, you should plan your work on a vignette so that it can be completed within the time available.
>
> In addition to the vignette directions, other task information is provided, such as program and code requirements, that is needed for solving the problem posed by the vignette. The requirements established by these materials are to be observed since they will be used in scoring the vignette. You should not consider outside information that conflicts with the requirements presented in the vignette, such as knowledge of code requirements in a particular jurisdiction. The problems presented by the vignettes are intended to be straightforward and solvable using the information provided. You should not assume that any unstated unusual conditions exist.
>
> Differences in preferred work styles and degrees of comfort with using a computer as a design tool may dictate different strategies for different candidates in working out and recording solutions to vignettes. Some may wish to work out and refine solutions on the screen using the tools provided, while others may wish to develop solutions on scratch paper and then use the tools to reproduce the solutions on the screen for recording and scoring.
>
> You may not use reference materials other than those provided in the vignette directions, texts, or other documents during the examination. You may use the scratch paper that has been provided, but you must turn it in at the end of the examination. YOU ARE NOT TO USE ANY OTHER PAPER.
>
> Your solution to each problem will be scored, as appropriate, on the basis of responsiveness to code and program requirements, technical soundness, and adherence to principles of sound design logic.

FIG. 51(b)

> Task Information
>
> To return to the Vignette Index, click on the Index button at the top of the screen. To go to the work screen, press the space bar.
>
> ### Program
>
> A World War II monument was erected on a slope in the city park in the late 1940's. It consists of a stone paved area with an obelisk at its center. The park is surrounded by private properties.
>
> 1. Regrade the site so that water will flow around and away from the stone paved area.
> 2. The stone paved area shall remain undisturbed.
> 3. The existing light stands on either side of the monument and the two groups of existing trees shall not be disturbed.
> 4. The slope of the regraded portions of the site shall not exceed 20%.

FIG. 55

| | |
|---|---|
| Feature: | F1: Primary Object Drainage |
| Possible Values: | A, U |
| Multiplier: | |
| Rule: | A: The amount of water draining across the primary object is decreased by <Min%ImproveForA> (use 75%). |
| | U: It isn't. |
| Method: | The amount of water that crosses the primary object before the candidate's contour alterations must be measured. If the alterations result in a Min%ImproveForA> decrease in the amount of water entering the primary object from the site, an A is assigned. |
| Comment: | |
| Question: | |

FIG. 58

| | |
|---|---|
| Feature: | F2: Cut or Fill Within Exclusionary Objects or Over Property Line |
| Possible Values: | A, U |
| Multiplier: | |
| Rule: | A: Contour manipulation has not taken place within exclusionary objects, beyond <ExclusionaryObjectBuffer> (use 300mm) or beyond the PropertyLine beyond <ExclusionaryObjectBuffer>. |
| | U: Anything else. |
| Method: | Manipulation is considered to have happen if contours within exclusionary object deviate more than <ExclusionaryObjectBuffer> from their initial positions. |
| Comment: | |
| Question: | |

FIG. 59

| | |
|---|---|
| Feature: | F3: Touching or Overlapping Contours |
| Possible Values: | Fatal |
| Multiplier: | |
| Rule: | A: Contours of differing elevations do not touch or overlap. |
| | F: Anything else. |
| Method: | |
| Comment: | |
| Question: | |

FIG. 60

| | |
|---|---|
| Feature: | F4: No Contour Manipulation |
| Possible Values: | Fatal |
| Multiplier: | |
| Rule: | A: The candidate has manipulated (drawn) one or more contours. |
| | F: Anything else. |
| Method: | |
| Comment: | |
| Question | |

FIG. 61

M1: Site Section

| Composed of: | Matrices/features | Multiplier | Possible Values |
|---|---|---|---|
| | F1 Slope Drainage | 1 | AU |
| | F2 Primary Object Drainage | 2 | AU |

U's

| M1 | 0 | 1 | 2 | 3 | 4 | 5 | 6 | 7 | 8 | 9 | 10 |
|---|---|---|---|---|---|---|---|---|---|---|---|
| 0 | A | I | | | | | | | | | |
| 1 | A | I | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

I's (row label)

FIG. 62

COMPUTER-BASED SIMULATION EXAMINATION OF ARCHITECTURAL PRACTICE

TABLE OF CONTENTS
BACKGROUND OF THE INVENTION
  FIELD OF THE INVENTION
  DESCRIPTION OF RELATED ART
    Figural Response
    Difficulties with prior art methods
SUMMARY OF THE INVENTION
ADVANTAGES OF THE PRESENT INVENTION
BRIEF DESCRIPTIONS OF THE DRAWINGS
DETAILED SUMMARY OF THE INVENTION
  PLATFORM AND THIRD PARTY SOFTWARE
    Invention not limited to particular vignettes
  AUTHORING SUBSYSTEM
  DELIVERY SUBSYSTEM
  FRAMEWORK
    Framework Software Directories For One Preferred Embodiment
  OSA
  INTERFACE
    Description of Common Tools
      Sketch Icon Tools
      ORTHO Icon Tool
      ZOOM Icon Tool
      CURSOR Icon Tool
      UNDO Icon Tool
      ERASE Icon Tool
      ID Icon Tool
      CALC Icon Tool
      TASK INFO Icon Tool
      Start Over Icon Tool
      REVIEW Icon Tool
    Description of Unique Tools
      CHECK Icon Tool
      DRAW Icon Tool
      MOVE,ADJUST Icon Tool
      MOVE GROUP Icon Tool
      ROTATE Icon Tool
      LAYERS Icon Tool
      SET ROOF Icon Tool
    Icons for Another Embodiment
      DONE Icon Tool
      OPTIONS Icon Tool
      ROTATE SITE Icon Tool
      ROTATE SKYLIGHT Icon Tool
  VIEWING WINDOWS
    Information Window
    Help Window
    Work Window
    Task Information Screen
      Informational Screens
      Vignette Directions Screen
      Program Screen
      Tips Screen
      General Test Directions Screen
  SOLUTION SCORING SYSTEM
    Scoring method generally
      Decomposition
      Scoring Trees
      Scoring Tree Nodes, Clusters, Features and Classifications
      Scoring Matrices
    Scoring method particulars for architects examination.
      Extraction
      Matrix calculation
      Authoring files (".aut")
      Scoring matrix files (".mtx")
      Scoring Techniques
        A Computer Method For Determining If an Object Can Be Viewed From Another Object
        A Computer Method for Calculating Setback Polygons
        A Computer Method for Determining Building Insolation and Shadow
        A Computer Method for Verification of Wheelchair Accessibility in an Office.
DETAILED DESCRIPTION OF ONE PREFERRED EMBODIMENT:
  THE ACCESSIBILITY—TOILET ROOM VIGNETTE
  Description of a Vignette
  Scoring of Vignette
  Required Materials for Vignette
  Authoring Requirements of Vignette
  Technical Overview
    Authoring
    Smart Delivery
    Interface
      Elements Which Are to Be Drawn or Placed
      Breakdown of Each Element
      4" Wall
      8" Wall
      Doors
      Grab Bar
      Lavatory and Handicapped Lavatory
      Room Labels
      Shower
      Bidet
      Stall
      Urinal and Handicapped Urinal
      Water Closet and Handicapped Water Closet
      Move/Adjust
      Move Group
      Rotate
      Icons
      Grid Snap
ANOTHER PREFERRED EMBODIMENT
  THE HYPOTHETICAL BATHROOM REMODEL VIGNETTE
  Scenario
  Program
  Scoring
  Fixtures Cluster (M7, M8 and M9)
    Table 1.
      Enumeration of Feature Values Corresponding to Toilet, Lavatory and Bathtub Clusters
    Table 2. Summary Matrix for Fixture Cluster
  SOFTWARE FILE STRUCTURE
    .m13 files
    .aut files.
    .dwg files.
    .mtx files.
    .dll files.
    .log files.
REFERENCES
SOURCE CODE APPENDIX
  SAMPLE AUTHORING FILE FOR ACCESSIBILITY-TOILET VIGNETTE C607a.aut
Spaces
Doors
Tags
GrabBar
InfantChangingTable
Lavatory
ALavatory
AShower
Urinal
AUrinal
WaterCloset
AWaterCloset
VIEW SOURCE CODE
  View.h
  View.cpp
SETBACKS SOURCE CODE
  Lot.cpp
  Lot.h
  Scfilter.cpp
  Scfilter.h
  Site.cpp
  Site.h
SITE GRADING VIGNETTE SOLUTION SOURCE CODE
  Features Directory
    ALLFEAT.CPP
    ALLFEAT.H
    B3FTDICT.CPP
    B3FTDICT.H
    SCFILTER.CPP
    SCFILTER.H
  FILTAB Directory
    FILTAB.CPP
    TEST.CPP
  Q Directory
    BUG.CPP
    BUG.H
    COVER.CPP
    COVER.H
    PRIMOBJ.CPP
    PRIMOBJ.H
    QDATA.CPP
    QDO.CPP
    QDO.H
    QPOINTS.CPP
    QPOINTS.H
    QTEST.CPP
    RAIN.CPP
    RAIN.H
    SYSHEAD.H
    VIOLATE.CPP
    VIOLATE.H
  Root Directory
    B3DRES.H
    B3S.CPP
    B3S.DEF
    B3S.H
    LINK__S.CPP
  Solution Directory
    AUTDATA.CPP
    AUTDATA.H
    CONTOUR.CPP
    CONTOUR.H
    SITE.CPP
    SITE.H
  B3 Directory
    B3S.MTX
    FILTAB.CPP
    QQQ.H
CLAIMS
ABSTRACT A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

1. Field of the Invention

The present invention relates to computer-based technology in assessment particularly for the licensing and certification of professionals such as architects, civil engineers, aeronautical engineers, mechanical engineers, naval engineers, interior design, landscape design, architectural design, etc. For assessment of architects, the system includes tools and methods for item creation, computer programs for computerized item presentation, and programs for automatically scoring test responses by computer.

The purpose of assessment in licensing and certification is to make accurate and reliable decisions as to whether a candidate has met certain standards of competent performance, ordinarily involving a range of higher order cognitive skills as well as the mastery of an extensive knowledge base.

The National Council of Architectural Registration Boards (NCARB) each year prepares the Architecture Registration Exam (ARE) to register entry-level candidates for the practice of architecture. This registration examination is used by 55 member jurisdictions and most Canadian provinces as the basis for initial licensure and reciprocity. The goal of the Architecture Registration Exam is to ensure that only architectural candidates proven to meet a competency level established to protect the health safety and welfare of the public are allowed to practice in the profession.

In the past, the examination consisted of several multiple-choice tests and graphics tests administered annually over a four-day period, with the graphics tests administered one additional time each year. The core functions of architectural practice, namely, site design and building design, are accorded fundamental importance in the graphics tests. Since the purpose of the examination is to protect the public's health safety and welfare, the component tests focus on essential elements of competent practice, rather than on areas like aesthetics of design. Nonetheless, candidates have some opportunity to display creativity by accomplishing tasks requiring problem-solving under constraints.

2. Description of Related Art

While the ARE was originally entirely a paper-and-pencil based test, recently multiple-choice parts of the examination have been administered by computer in a format patented by Educational Testing Service, inventors' assignee, and called Computerized Mastery Testing. That patent, U.S. Pat. No. 5,059,127, entitled COMPUTERIZED MASTERY TESTING SYSTEM, A COMPUTER ADMINISTERED VARIABLE LENGTH SEQUENTIAL TESTING SYSTEM FOR MAKING PASS/FAIL DECISIONS, is hereby incorporated herein.

In the paper-and-pencil implementation of the building design graphics test, a candidate for registration spends 12 hours developing plans and drawing related sections and elevations. The output of this paper-and-pencil test is a pad of four drawings. Over a hundred architect/jurors meet for three days twice a year to grade these drawings using a holistic grading process.

While in the paper-and-pencil implementation of the site design graphics test, a candidate spends two and three-quarters hours developing solutions to site design vignettes. These drawings are also graded holistically in sessions twice a year involving nearly seventy additional architect/jurors.
Figural Response.

The present invention is different from another testing methodology called "figural response" invented and patented by applicants' assignee Education Testing Service. See, e.g., U.S. Pat. No. 5,011,413, entitled MACHINE-INTERPRETABLE FIGURAL RESPONSE TESTING.

Figural response requires the candidate to respond to a graphic question or problem presented on a video display, by drawing lines or other simple geometric figures, positioning arrows or other markers on the graphic, or repositioning elements of the graphic, etc. While figural response may appear to be similar to the simulation methodology of the present invention, differs in many respects—some of which follow. The tasks required of the candidate in figural response were necessarily simpler resulting in problems of a relatively limited nature with but one correct answer for each figural response item.

Figural response relies on bitmap graphics; the present invention relies on a completely different method of image representation called vector graphics. Two main benefits of a vector based approach to graphics are that all the things shown on the screen to the candidate are represented as discrete and insular "objects" inside the computer, rather than as mere regions of a bitmap. A vector/object approach makes building a rich and complex scoring system a much less arduous task. Similarly, a vector/object approach makes the creation of new objects much easier to do.

Though both tests are graphical in presentation the nature of the tasks required by the test taker are very different. Figural response required the test taker to use a mouse to select one of several pictures, or to draw a line connecting two related images. Each figural response item has a single correct answer. The present invention asks the candidate to construct a complete architectural drawing on a nearly blank background. Because of the level of detail allowed, and a conscious effort on the part of the developers to allow for individual style and creativity, there can be an infinite number of equally valid solutions to most of the ARE items.

The figural response items were limited to fixed screen sizes whereas the items of the present invention can be used at any resolution from 480×600 on up. This is because vector images can scale themselves to fit various screen or area requirements much more easily than bitmaps can.

Finally, although figural response items are scored by computer the scoring programs are much simpler because the tasks required of the candidate were much simpler. The simplicity of the task also means that there is only one correct answer to a figural response question, as noted above. Despite that simplicity, there was very little reuse of code across figural response scoring programs; every item needed its own scoring program. The present invention uses the same code for an entire vignette item family. Currently a vignette family may consist of twenty-four individual items which are equivalent in difficulty and the skills tested.
Difficulties with prior art methods.

There are several inherent difficulties with the ARE's paper-and-pencil method of test administration. In particular, the paper-and-pencil ARE could only be scheduled infrequently—twice a year. Many weeks were needed for scores to be reported to candidates because of the time required to plan and host a "convention-style" grading where many human graders were flown into a central grading location.

The paper and pencil ARE exams were scored in large convention style settings. Such gradings involve finding skilled architects who can take time off from their work to serve as graders, transporting them to a central location, making hotel arrangements for all the people involved, and hiring and training temporary clerical staff to manage a large volume of secure paper.

Humans grade less consistently than computers and are harder to monitor. Human grades rely on a gross holistic view of a solution which incorporates much less detail and precision than computer scores.

Computer generated ratings may be superior to human scores because testing experts and experts skilled in the art of architecture can manipulate the relative impact that each feature of a solution that is analyzed has on the solution's final score.

SUMMARY OF THE INVENTION

The present invention provides a computer-based method and system for competency level assessment of professionals such as architects and engineers. The invention also provides a new computer-based simulation of architectural practice. The system can replace and/or complement paper-and-pencil professional assessments. The system of the present invention provides for computer-based delivery and scoring of the examination.

One preferred embodiment of the present invention provides a fully computer-administered and computer-automated scoring of open-ended computer-based simulations corresponding to the earlier two "graphic" or open-ended questions covering Building Design and Site Design of the ARE examination. This preferred embodiment of the present invention assesses, in a realistic setting, the higher-order skills considered essential to the competent practice of architecture, and in particular, the aspects of site and building design.

The testing system of one preferred embodiment of the present invention comprises three distinct functional subsystems—authoring, delivery and scoring.

The authoring subsystem provides the functionality required to "author" or create and establish scoring rules and criteria for the test items, that is, particular vignettes. It allows the test creator to specify the names and attributes of spaces that will comprise a unique script. These attributes consist of conditions that are internal to the space itself and which are to be met by the candidate.

The delivery subsystem assembles a complete test item for a candidate based on instructions stored in the authoring (".aut") file which tells the delivery subsystem to reference various files stored in multiple formats and locations and how to present certain features, options, menus, and drawing elements to the candidate. One preferred embodiment of the delivery subsystem relies on item Framework software which has been compiled as a dynamic link library (".dll" file) and which includes a large library of computer code representing geometric objects that are referenced in current and foreseeable test items, this code may be reused, in whole or part, for future test items. The preferred embodiment of the delivery subsystem of the present invention interfaces with ETS's OPEN SYSTEMS ARCHITECTURE (OSA) test administration system which provides many of the administrative capabilities of the present invention. ETS has a patent directed to among other things, computer systems and methods which include OSA capabilities, it is U.S. Pat. No. 5,565,316, "SYSTEM AND METHOD FOR COMPUTER BASED TESTING" which is hereby incorporated herein.

In order to score a vignette, the candidate's solution must be decomposed and then analyzed so a score can be assigned. Decomposition is another way of saying that the graphic response of the candidate is represented in mathematical terms suitable for analysis. Additionally, the scoring method relies on a knowledge elicitation and representation approach developed by one of the co-inventors of the present invention. The method produces a treelike or hierarchical organization of problem features needed to characterize performance on a problem class or vignette type.

There are basically two types of nodes in the scoring tree hierarchy. One type consists of low-level features requiring a direct computation from the solution, such as computing the location of an element, the distance between design elements, or counting the presence or absence or some elements. The second type of node consists of clusters of lower-level features. All possible values for a cluster can be represented by a two-dimensional matrix. The matrix approach to summarize scores is a convenient format to rank the feature cluster measures, and locate tuples to identify the combinations associated with a particular score.

After the vignette is scored it is sent along with information about the test item, the answer and the test taker to a back end process which combines the individual vignette scores and issues a score report for the test taker.

ADVANTAGES OF THE PRESENT INVENTION

The computer interface of the present invention is powerful and easy to learn, and yet consistent across different types of vignettes.

Because of the design of the computer interface of the present invention, the speed with which a candidate renders a solution to a particular vignette is increased, which permits either a shorter testing period or more vignettes to be administered in the same period of time. An increase in the number of vignettes permits sampling of a wider variety of skills than previously possible.

Other advantages of the computer-based testing of the present invention includes accuracy, consistency and quick turn-around time.

It is an object of the present invention to provide a computer-based system for assessment purposes, in whole or in part, of professionals and more particularly in the licensing and certification of architects.

It is an object of the present invention to provide an examination for assessing professionals for licensure or certification which has computer-based simulations which realistically simulate problems in architectural planning and design.

It is a further object of the present invention to provide for scoring of the computer-based simulations by computer algorithms that do not require further hand scoring by experts, except as a quality control procedure.

BRIEF DESCRIPTIONS OF THE DRAWINGS

FIGS. 12–34 show several of the Features, including A, I and U scoring, for the Accessibility—Toilet Room Vignette of one preferred embodiment of the present invention.

FIG. 35 shows the Master Features Matrix for the Accessibility—Toilet Room Vignette of one preferred embodiment of the present invention.

FIG. 36 shows the Entry Door Features matrix for the Accessibility—Toilet Room Vignette of one preferred embodiment of the present invention.

FIG. 37 shows the Handicapped Fixtures Features matrix for the Accessibility—Toilet Room Vignette of one preferred embodiment of the present invention.

FIG. 38 shows the Grab Bar Features matrix for the Accessibility—Toilet Room Vignette of one preferred embodiment of the present invention.

FIG. 39 shows the Other Fixtures Features matrix for the Accessibility—Toilet Room Vignette of one preferred embodiment of the present invention.

FIG. 40 shows the Travel Path Features matrix for the Accessibility—Toilet Room Vignette of one preferred embodiment of the present invention.

FIG. 41 shows the Design Logic Features matrix for the Accessibility—Toilet Room Vignette of one preferred embodiment of the present invention.

FIG. 42 shows the directions for drawing the 4" wall for the Accessibility—Toilet Room Vignette.

Figure 51A:
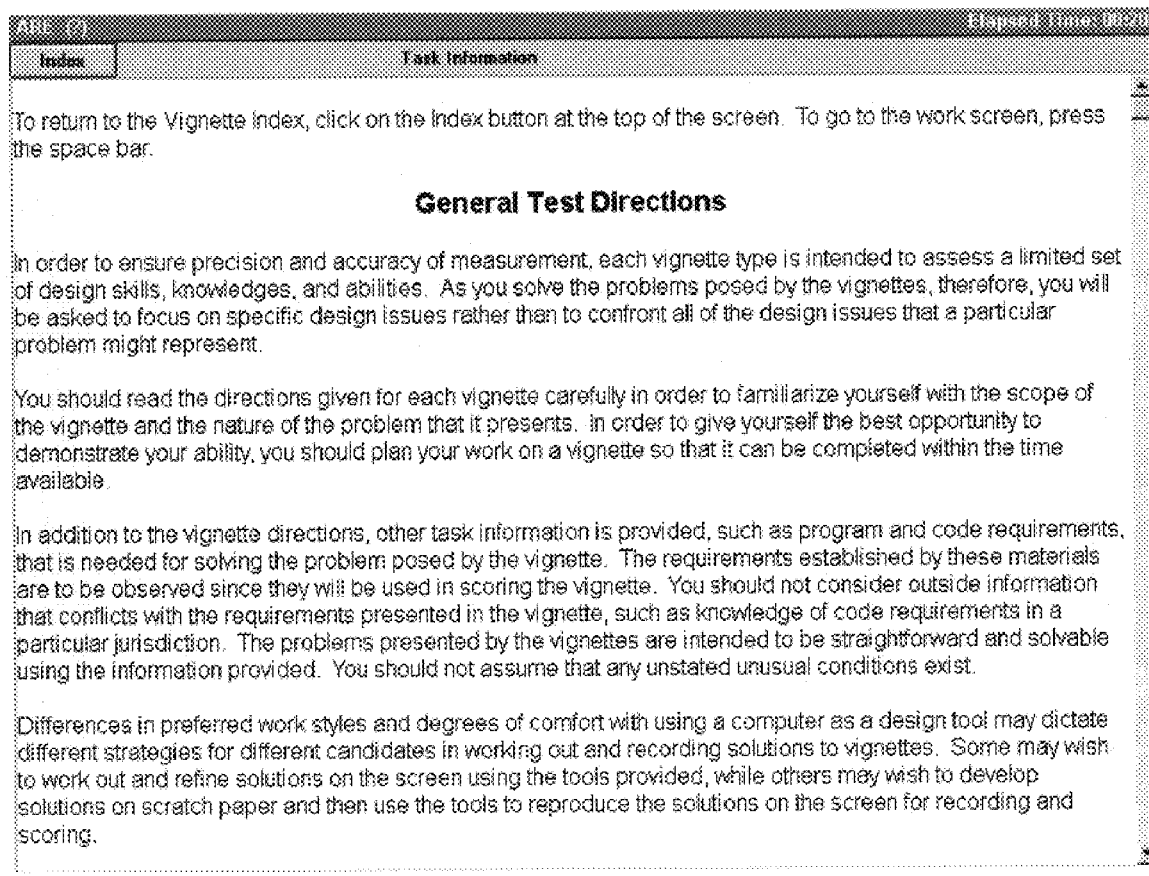

FIGS. 51(*a*) and 51(*b*) show the general test directions screen for the Site Section Vignette of a preferred embodiment of the present invention.

Figure 52:
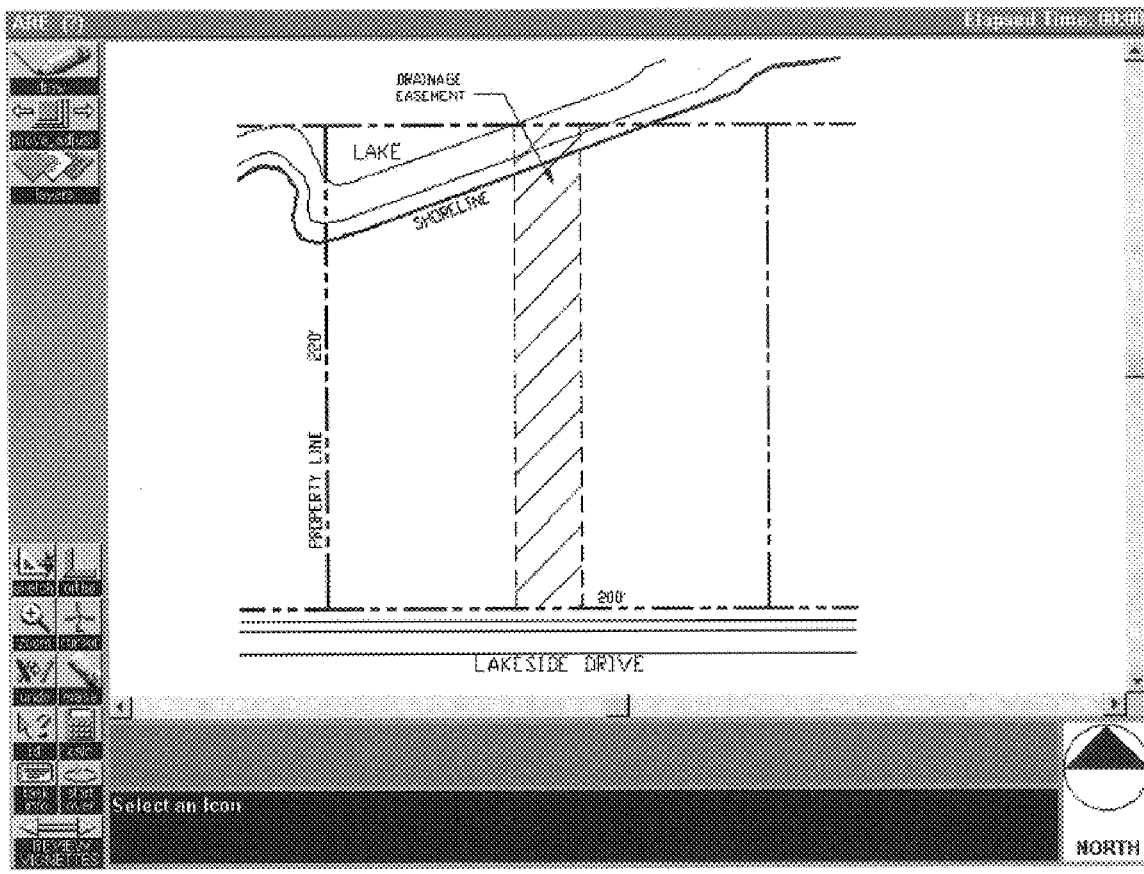

FIG. 52 shows the display screen for the Site Analysis Vignette of a preferred embodiment of the present invention.

Figure 53:
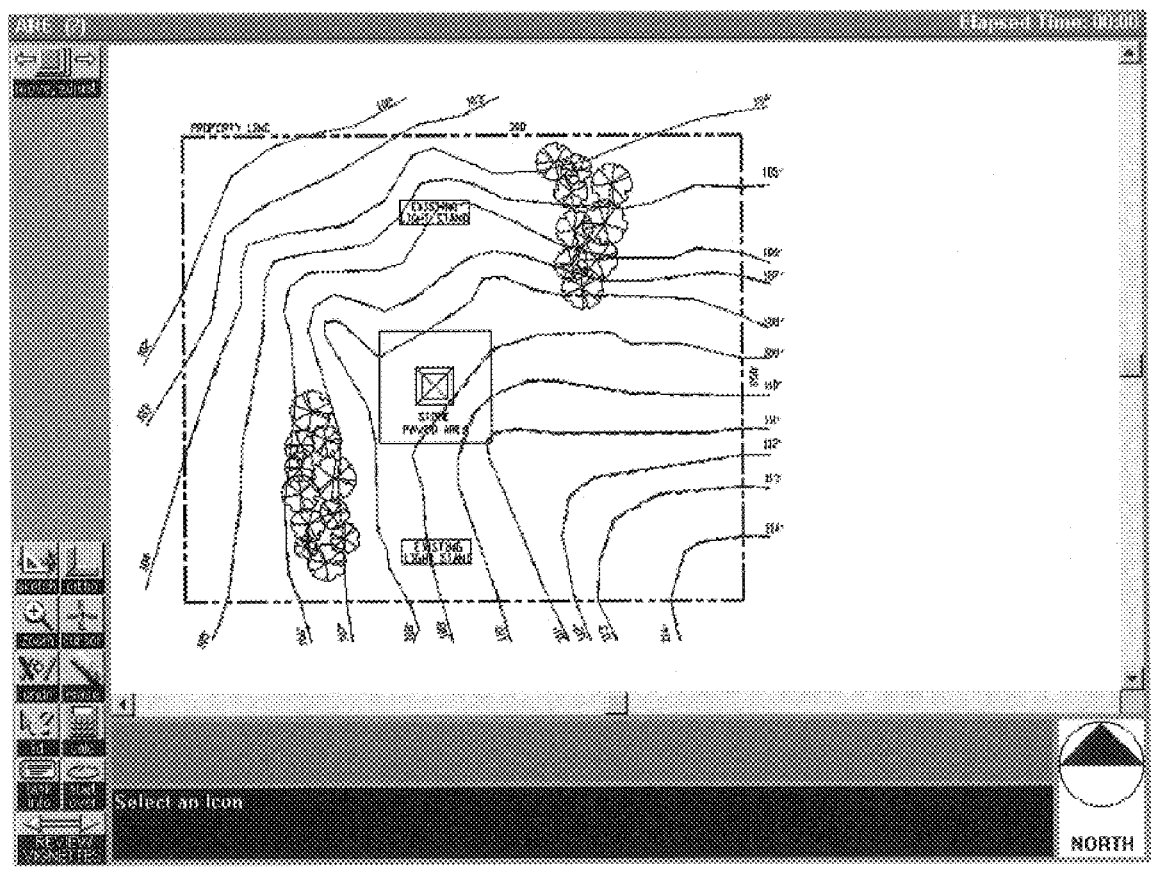

FIG. 53 shows the display screen for the Site Grading Vignette of a preferred embodiment of the present invention.

Figure 54:
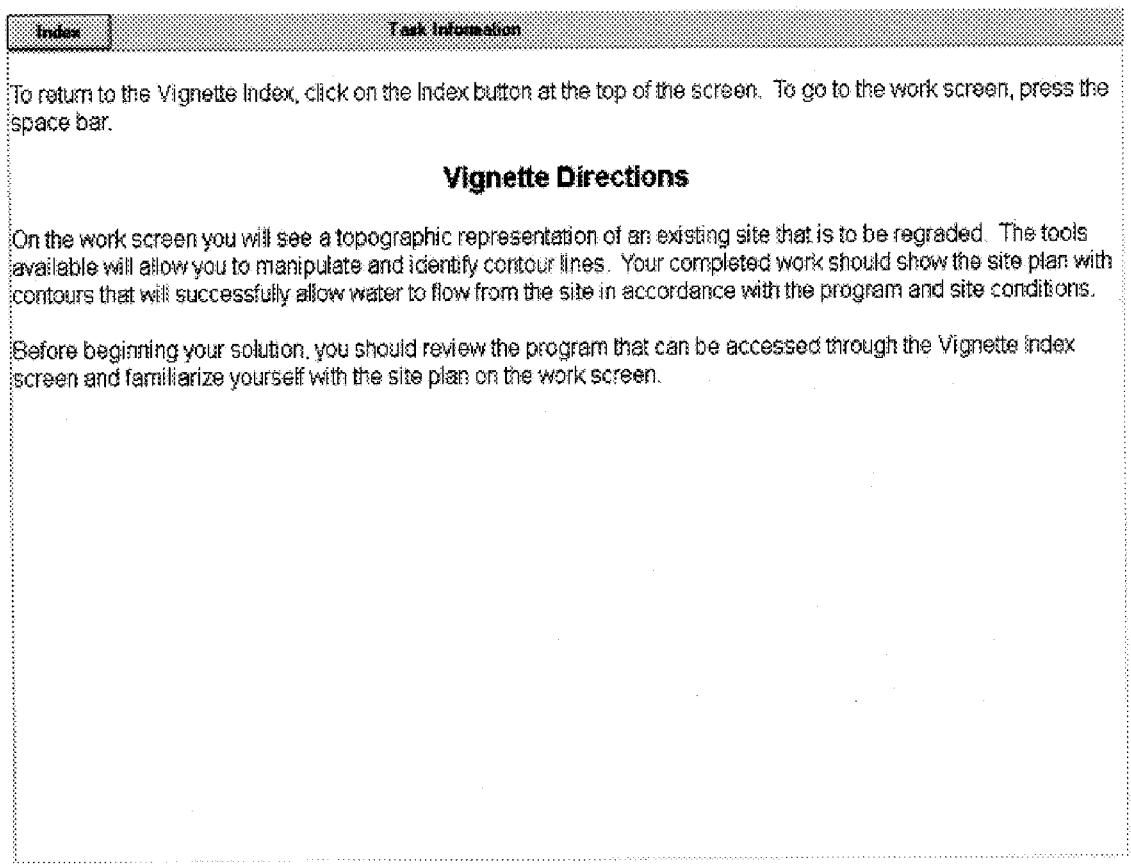

FIG. 54 shows the vignette directions screen for the Site Grading Vignette of a preferred embodiment of the present invention.

FIG. 55 shows the program screen for the Site Grading Vignette of a preferred embodiment of the present invention.

Figure 56:
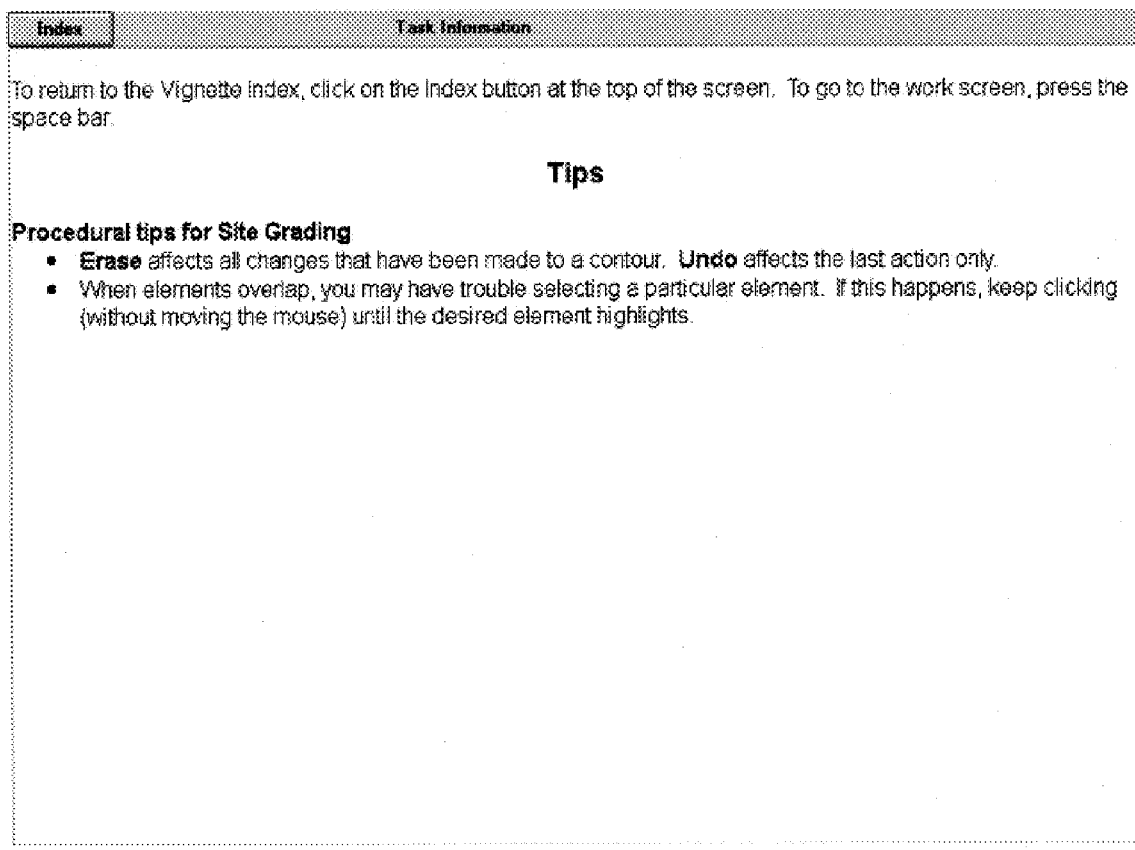

FIG. 56 shows the tips screen for the Site Grading Vignette of a preferred embodiment of the present invention.

Figure 57:
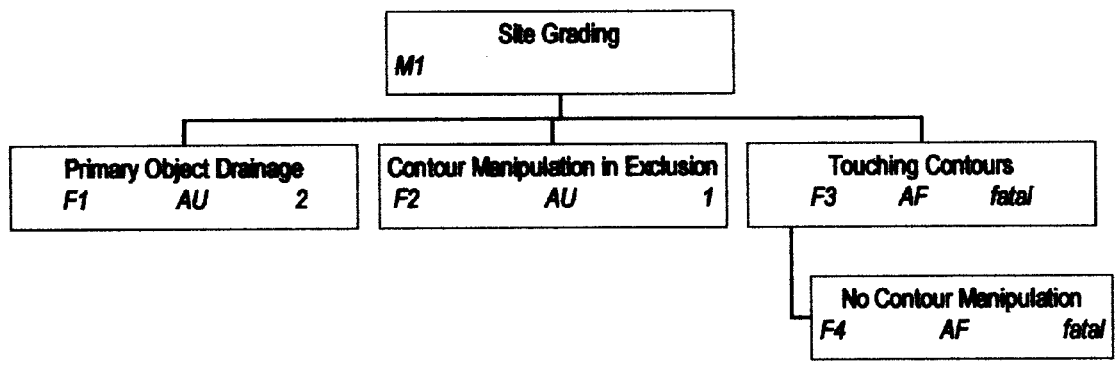

FIG. 57 shows the computer scoring decision tree for the Site Grading Vignette of a preferred embodiment of the present invention.

FIGS. 58–61 show several of the features, including A, U and F scoring, for the Site Grading Vignette of a preferred embodiment of the present invention.

FIG. 62 shows the features matrix for the Site Grading Vignette of a preferred embodiment of the present invention.

Figure 63:
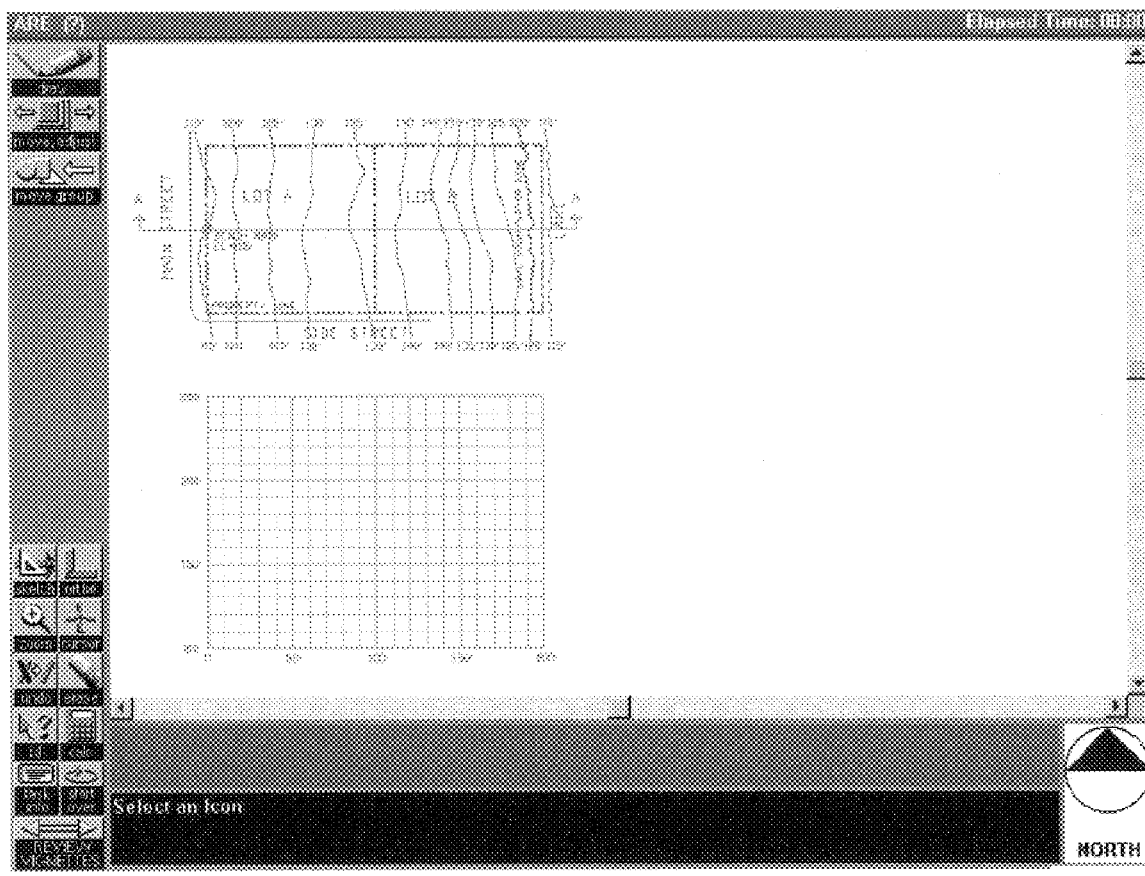

FIG. 63 shows the display screen for the Zoning Section Vignette of a preferred embodiment of the present invention.

Figure 64:
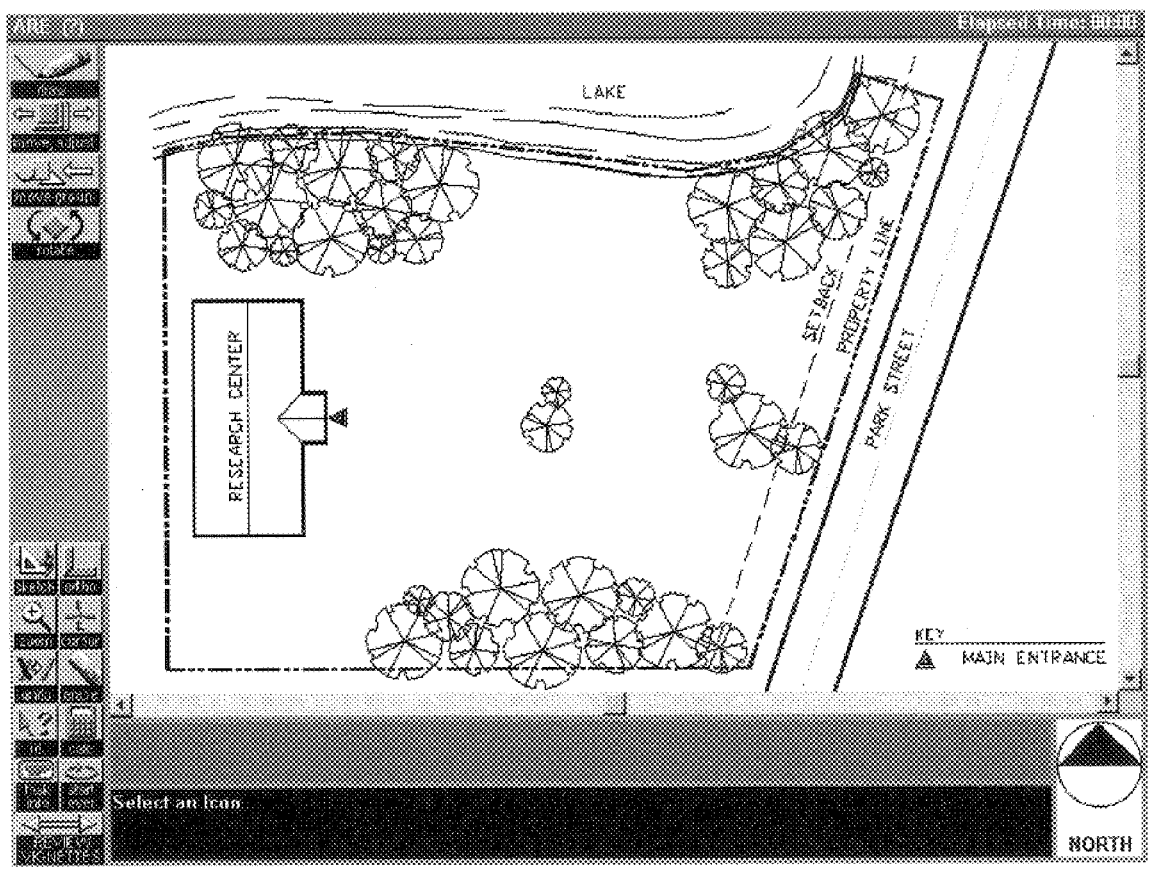

FIG. 64 shows the display screen for the Site Parking Vignette of a preferred embodiment of the present invention.

Figure 65:
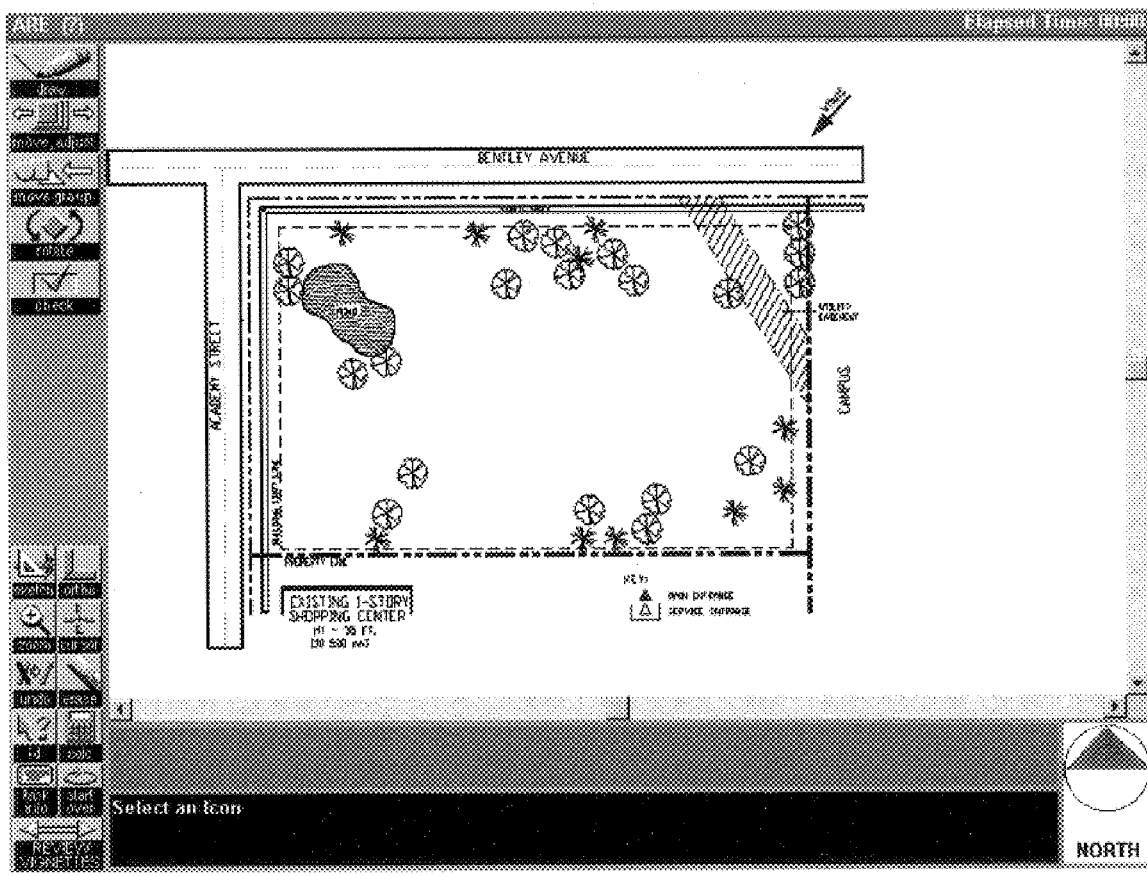

FIG. 65 shows the display screen for the Site Design Vignette of a preferred embodiment of the present invention.

Figure 66:
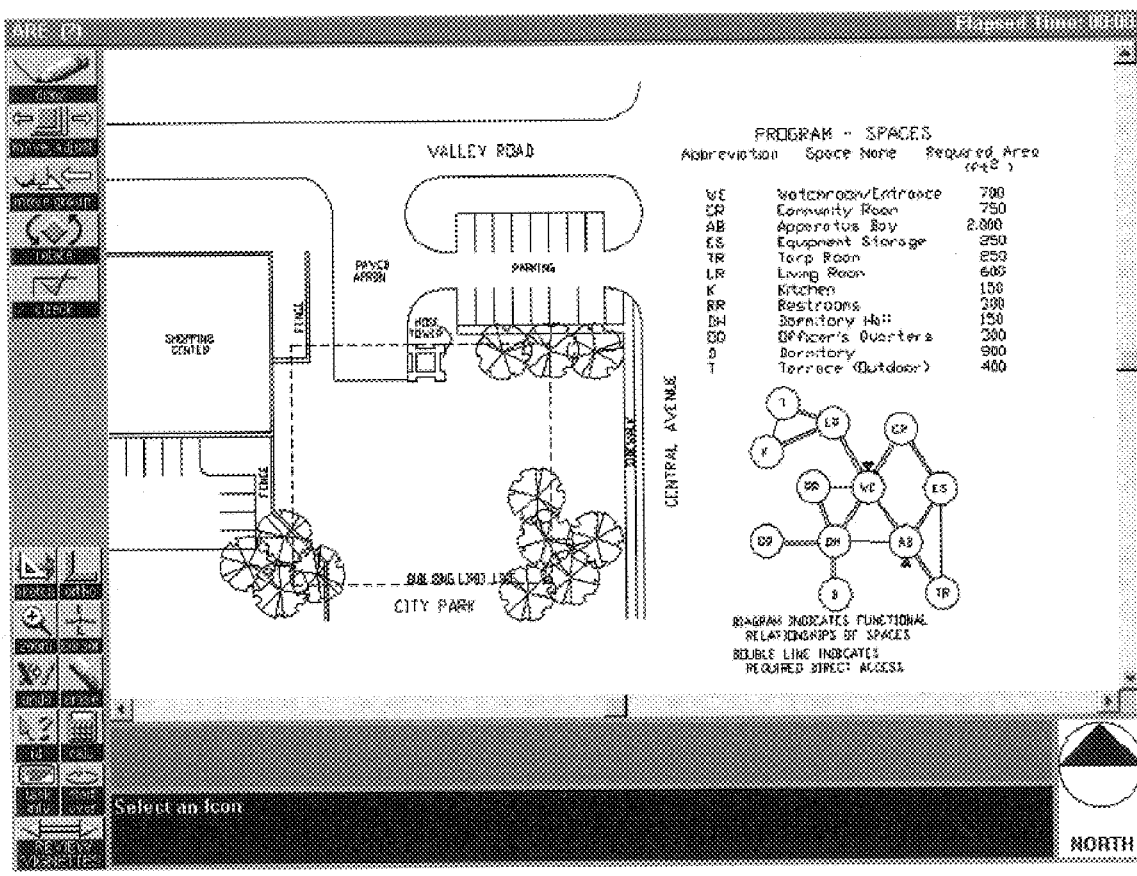

FIG. 66 shows the display screen for the Block Diagram Vignette of a preferred embodiment of the present invention.

Figure 67:
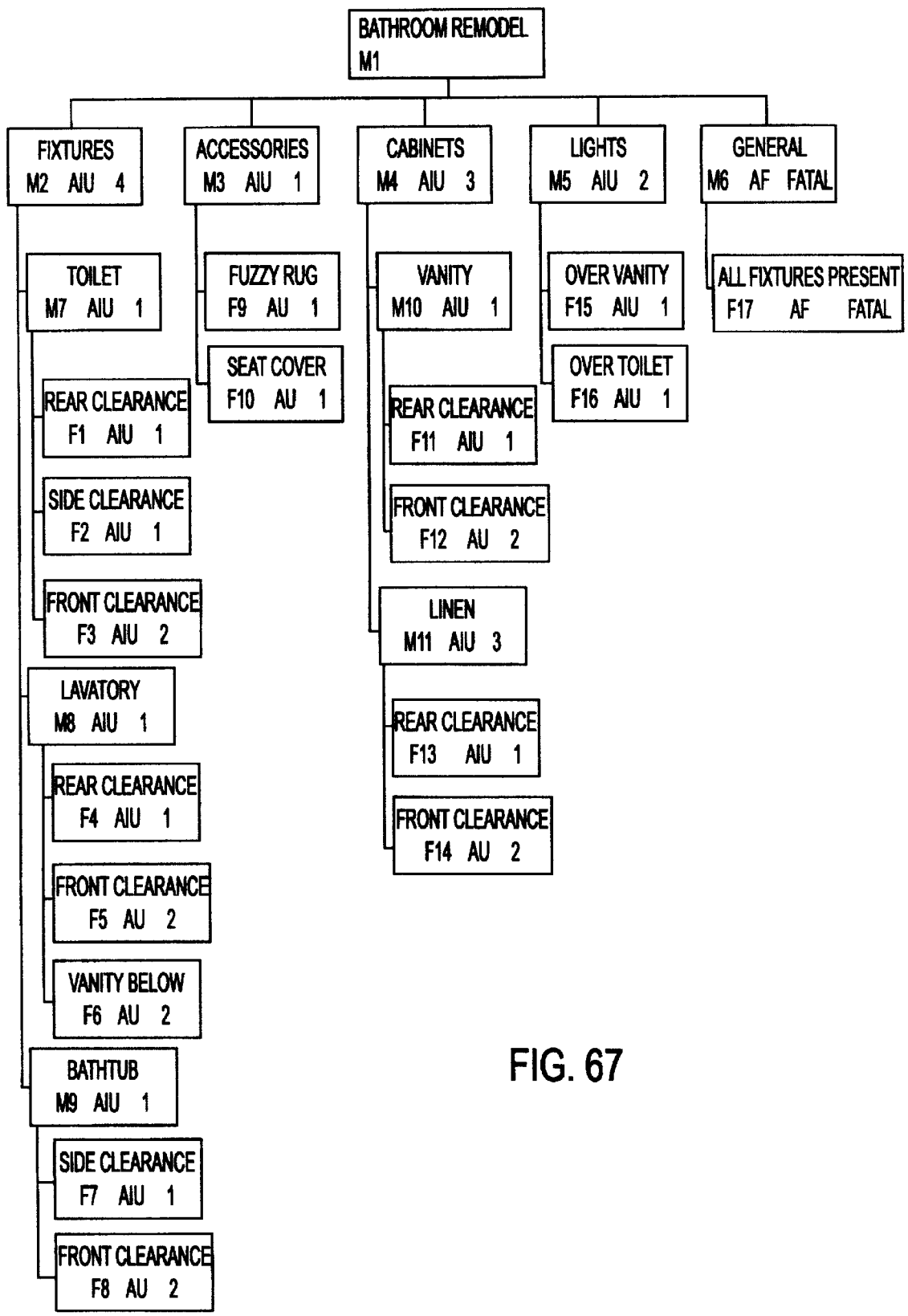

FIG. 67 shows the scoring tree or feature evaluation map for the hypothetical bath remodeling vignette.

Figure 68:
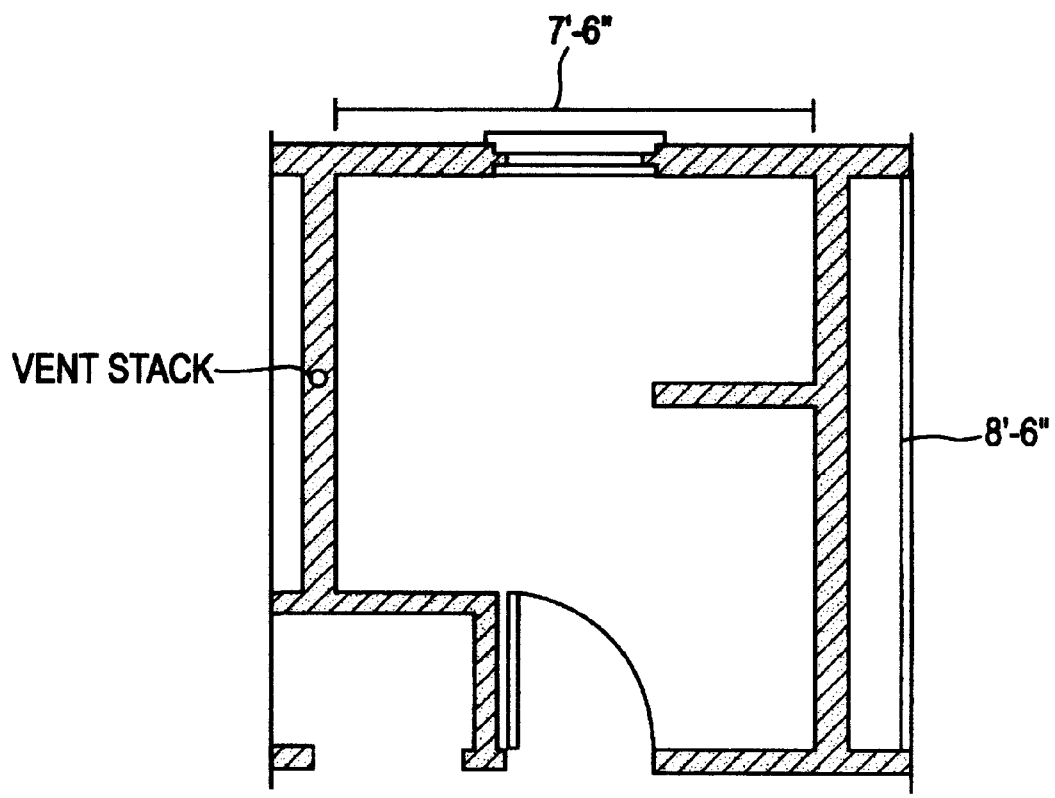

FIG. 68 shows the initial bathroom display for the Hypothetical Bathroom Remodel Vignette.

Figure 69:
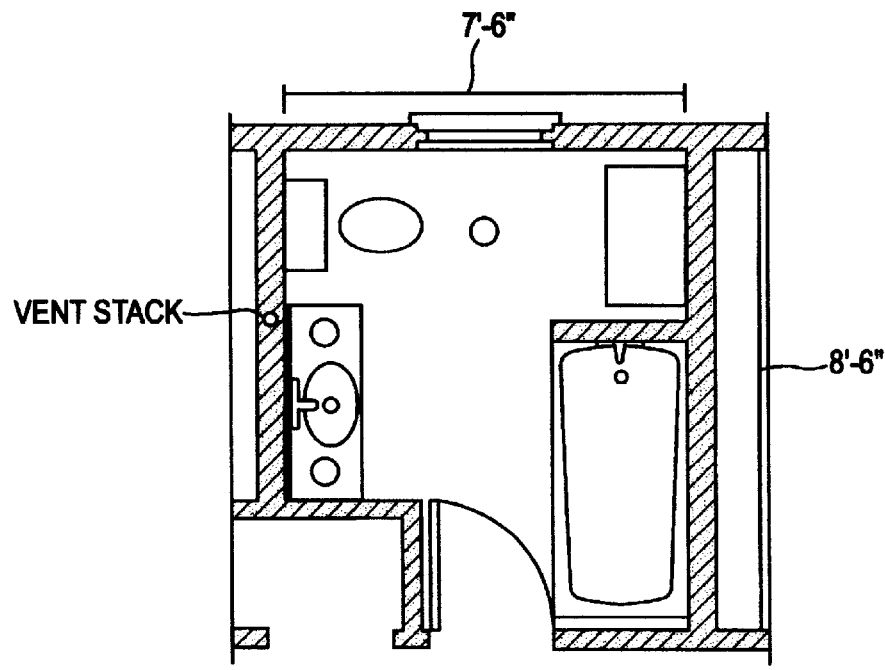

FIG. 69 shows a good solution to the Hypothetical Bathroom Remodel Vignette design problem.

Figure 70:
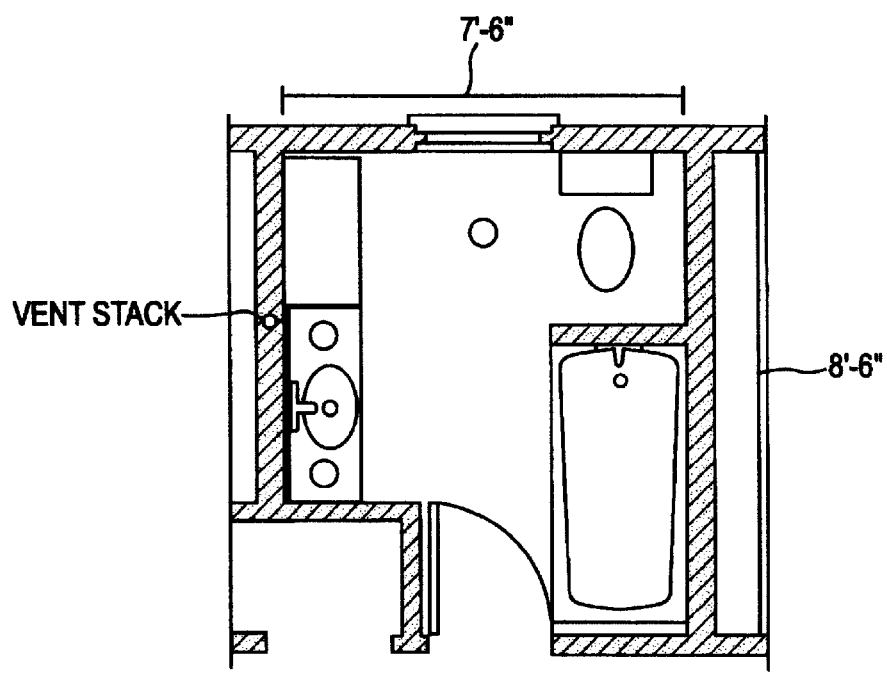

FIG. 70 shows a not so good solution to the Hypothetical Bathroom Remodel Vignette design problem.

DETAILED SUMMARY OF THE INVENTION

Figure 1:
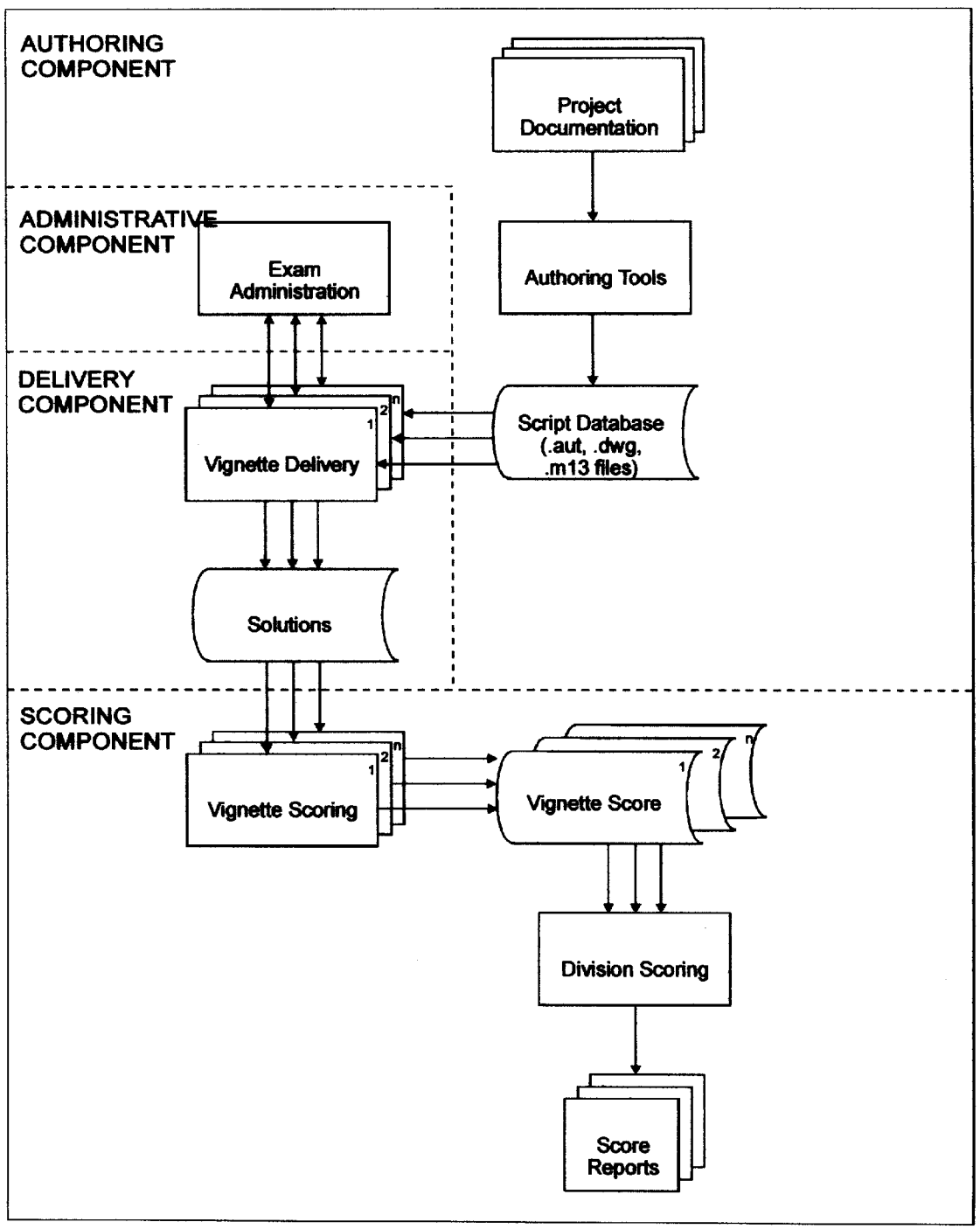
FIG. 1 shows a flowchart of one preferred embodiment of the present invention.

The present invention comprises a test delivery system and an automated scoring system. As described below, the test delivery system is divided between the platform, i.e., computer hardware and computer operating system and the interface presented to the candidate, i.e., the common and unique tools provided to the candidate, with which to answer the test assignments. See, FIG. 1

PLATFORM AND THIRD PARTY SOFTWARE

The delivery system for one preferred embodiment of the present invention comprises the following equipment. An Intel Corporation 80486 cpu (or better) based personal computer, with video display device (monitor), keyboard and mouse. Generally, a minimum of 8 megabytes of RAM, though the actual amount of memory required is dependent upon the operating system. Either Microsoft Windows 3.1 or Windows 3.11 running with Win32s 32 bit extension or Microsoft Windows 95, or Windows NT. Educational Testing Service's OSA scientific calculator.

AutoCAD® OEM distributed by Autodesk, Inc., 111 McInnis Parkway, San Rafael, Calif. 94903, USA. AutoCADO OEM is a computer-aided design (CAD) engine for third-party developers. It is built from AutoCAD® Release 12. It provides the foundation for new applications that require DWG compatibility. AutoCAD® OEM Release 2 lets developers and CAD managers use an OEM version of AutoCAD®, to create, industry-specific applications.

Microsoft's MediaView help screen viewer.

Rogue WaveTools.h++ version 5.2 by Rogue Wave Software.

Invention Not Limited to Particular Vignettes

While the descriptions of the embodiments of the present invention given below are generally disclosed in terms of one or another specific vignette, the present invention is not limited to the disclosed vignettes and one ordinarily skilled in the art will have no difficulty applying the disclosures to any number of different vignettes.

AUTHORING SUBSYSTEM

As the name suggests, the authoring subsystem provides the functionality required to "author" or create and establish scoring rules and criteria for the test items, that is, particular vignettes. It allows the test creator to specify the names and attributes of spaces that will comprise a unique script. These attributes consist of conditions that are internal to the space itself and which are to be met by the candidate. One example is square feet. The program, that is, the instruction to the candidate as to what the candidate is required to accomplish with respect to a particular vignette, may call for a space to be drawn with an area of a certain square feet. The authoring file will contain this space requirement, which will in turn be used by the scoring subsystem to check whether or not this program condition has been met. See, for example, the "SAMPLE AUTHORING FILE FOR THE ACCESSIBILITY-TOILET VIGNETTE" in the Source Code Appendix.

A primary function of authoring is that the drawings are used for a database of geometric information, the ".aut" files are used to reference this information, and provide additional information about how these geometric objects must relate to one another in a particular script. The ".aut" file, therefore, is a database of all non-geometrical information.

The scoring authoring subsystem may specify direct access and primary adjacency (for example, the inter-space relationships called for by the program), or relationships of spaces to site amenities (for example, a kitchen may need access to an alley so that deliveries can be made, and trash can be picked up).

"View" is another feature that the scoring subsystem may be required to extract from the authoring file. That is, a room may need a view of a site feature, and the fact that the candidates' instructional program calls for this relationship to exist would require the authoring subsystem to define certain parameters that are used in the scoring program's "view" formula. For instance, whether or not the view requirement has been met may depend on the distance of the room from the site feature, the angle of the side of the room containing a window with relation to the site feature, and how many other objects, and of what type, may be placed between the room and site feature before an otherwise valid view is considered obscured. All of these, and similar variables, are placed in the scoring authoring file. Because they have been stored outside the compiled code in a file that can be edited with any word processor, scoring tolerances can be altered quickly and easily without any re-writing or recompiling of computer code.

While the site amenities and site features mentioned are, in one preferred embodiment, displayed to the candidate in the form of a AutoCad® ".dwg" format, that format will not generally suffice to show all the underlying representations that may be needed. Therefore, the authoring subsystem provides means for creating these entities, capturing, specifying and detailing their attributes, which will include graphical and positional data, as well as attributes describing their transparency or opaqueness, their ability to enable or prevent pedestrian or vehicular access, and other parameters required by the delivery or scoring subsystem, or both.

Finally, the authoring subsystem has the ability to bundle all of this information along with all of the necessary supporting documentation (drawings, documents) etc. that are used on the "reference screen", and pass this information along to the delivery and scoring subsystems.

DELIVERY SUBSYSTEM

The delivery subsystem assembles a complete test item for a candidate based on instructions stored in the authoring (".aut") file which tells the delivery subsystem to reference various files stored in multiple formats and locations and how to present certain features, options, menus, and drawing elements to the candidate.

For example, an ".aut" file may contain a reference to the relevant site background drawing and a list of those tools which are specific to the test item will be available on the tool bar. It may also contain references to the location of item specific code libraries that may be external to the main executing program.

The primary function of this process is to allow the candidate to create a solution that will satisfy programmatic, code and design logic considerations. Therefore, this subsystem provides the candidate with the ability to draw spaces, and detail like doors, windows, and wall openings, and place elevators and stairs. Importantly, this subsystem offers the candidate the ability to draw the spaces that the script calls for.

Figure 2:
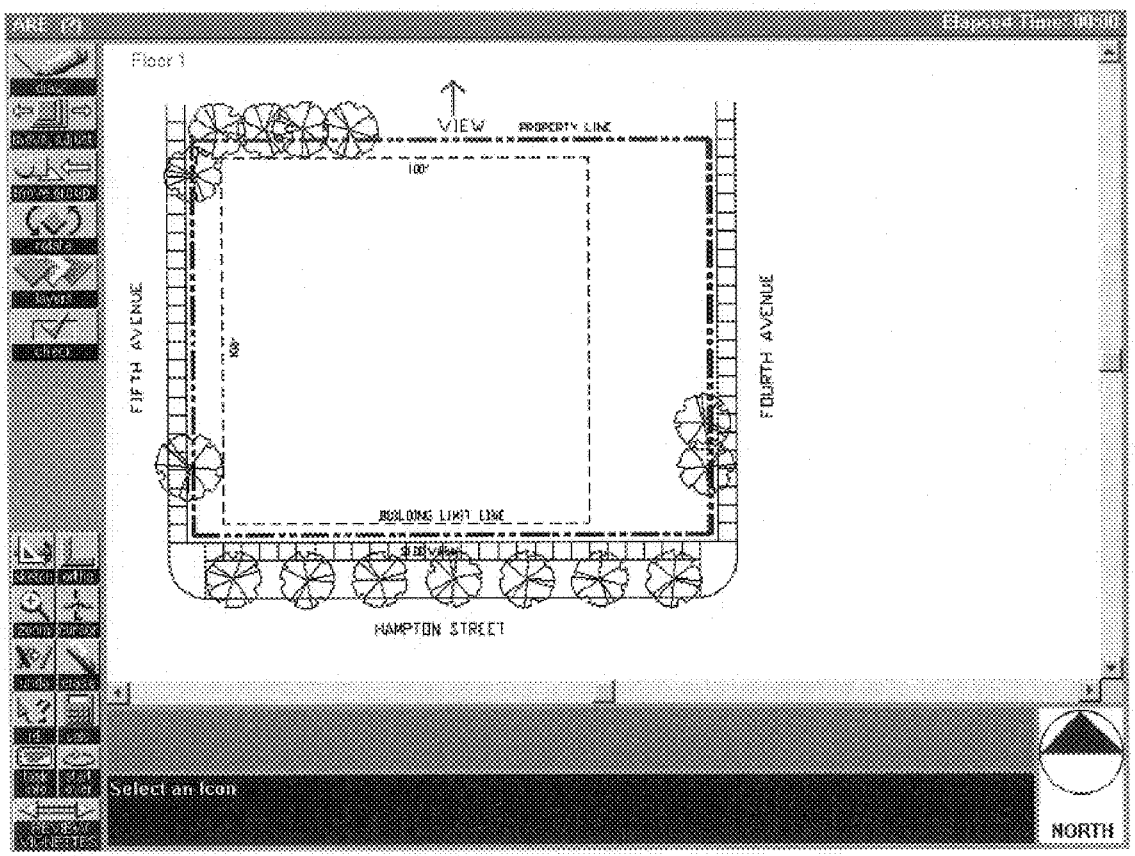
FIG. 2 shows the display screen for the Schematic Design Vignette of a preferred embodiment of the present invention.

In one preferred embodiment of the present invention, this subsystem for the schematic design type vignette (see, e.g., FIG. 2) provides the candidate with the ability to draw on a background image that shows the site, the buildable area, and the site amenities and features that they will have to consider in creating a solution. See the other displays screen figures for additional site amenities and features.

In the schematic design type vignette embodiment, the delivery subsystem also provides the candidate with the ability to zoom and pan, to move spaces and detail, to measure and to sketch, and to erase. The candidate can also work on more than one layer, in which case, he/she can view each layer separately or view an alternate layer in a manner (for example, a light color grey) which will allow it to be used by the candidate as a template. One kind of layer which can be viewed in this manner is a floor.

In the preferred embodiment of the present invention the candidate can not modify the background image. The delivery subsystem of this embodiment also provides the candidate with the ability to show or not to show a grid, to change cursors, to hide or show the site, or to hide or show alternate floors.

The delivery subsystem has the capability of limiting the actions a candidate may take. For example, as required by the particular script, the system may limit doors, windows and wall openings from being placed anywhere except within a wall.

The delivery system is not limited to the above capabilities. It is designed to be able to be modified to add capabilities as needed.

FRAMEWORK

The preferred embodiment of the present invention has item Framework software which has been compiled as a a Windows ® dynamic link library (".dll" file) and which includes a large library of computer code representing geometric objects that are referenced in current and foreseeable test items, this code may be reused, in whole or part, for future test items. Therefore, a typical vignette program requires very little additional code beyond that which is available in the Framework. The dll file provides a set of programs that are available to applications at run time.

One benefit in using the Framework of the present invention is that an interface function may have multiple uses. In one vignette it may check overlaps by examining the position of two vector polygons designated as "rooms" in that vignette's authoring file. While in another vignette that same interface function may be examining the position of polygons which represent two angled roof planes or a sidewalk that is required to be adjacent to, but obviously not inside, a building. This function was created to avoid penalizing candidates who may be uneasy with a computer mouse but who nevertheless attempted to position a required element with the correct relationship to another site or solution object.

The Framework file directory for one preferred embodiment of the present invention includes the following subdirectories: RESOURCE; COMPONEN; CONTROLS; DWG; EVENTS; FEATURES; GEOMETRY; GRAPHICS; HDR; MOUSETRK; OBJS; OSA; OSACALC; PERSTGEO; APPLICAT; SCORING; TRANSACT; VGNOBJEC; VGNTASKS; VGNWIND; and WINDOWS. While the function of the files found in a particular subdirectory may be obvious from the subdirectory's name, nevertheless a brief description follows.

Framework Software Directories For One Preferred Embodiment

RESOURCE <DIR> Windows Resource file includes BITMAPS, DIALOGS, and the STRINGTABLE containing Help Messages displayed on screen.

COMPONEN <DIR> Object components—bags, sets, nvtree code.

CONTROLS <DIR> Standard controls code for handling buttons, bitmaps.

DWG <DIR> Interfaces with AutoCADO OEM computer-aided design (CAD) engine.

EVENTS <DIR> Code to handle all mouse and keyboard events.

FEATURES <DIR> Code to do feature extraction for Scoring.

GEOMETRY <DIR> Geometry objects—includes points, lines, circles, rectangles.

GRAPHICS <DIR> Code to draw all the graphics to the screen.

HDR <DIR> Contains the definitions for pre-compiled headers.

MOUSETRK <DIR> DLL code to track mouse movement between windows.

OBJS <DIR> Object files created during compilation.

OSA <DIR> Messages used to communicate with OSA during administration.

OSACALC <DIR> OSA code for the on-screen calculator.

PERSTGEO <DIR> Persistent Geometry code for saving objects to disk.

APPLICAT <DIR> Vignette application main loop code.

SCORING <DIR> Scoring code to process matrix file and feature dictionary.

TRANSACT <DIR> Code to process all candidate screen transactions to allow UNDO/REDO capability.

VGNOBJEC <DIR> Objects common to all vignettes include sketch objects, full screen cursor, DWG objects.

VGNTASKS <DIR> Tasks common to all vignettes include the drawing of sketch objects, rotating, measuring, zooming, moving, identifying, selecting, erasing.

VGNWIND <DIR> Defines all the windows common to all vignettes.

WINDOWS <DIR> Code to interact with specific MicroSoft Windows® features, such as changing the cursor, accessing the timer, extracting information from the .INI file, and starting up a process.

A typical test item may rely on the Framework for 80% of its functionality and on new code for only about 20%. Framework includes a large library of computer code representing geometric objects that are referenced in current and many foreseeable test items. For example, the following functionality is available in one preferred embodiment:

1. Objects that are drawn by the candidate—lines, polygons, polylines, circles, etc.

2. Objects that are placed by the candidate—"dwg objects", which are vector objects that can be anything.

3. "Existing objects"—objects that are part of the background drawing, but whose whereabouts and properties need to be known by delivery (and/or scoring). These can be simple or complex geometric objects.

Use of the Framework has a positive impact on the process of item creation because item creators can rely on the library of pre-existing objects to use in creating a future item. Such items include architectural object definitions, such as-object sizes, object scales, object colors and object default orientations. OSA The preferred embodiment of the delivery subsystem of the present invention interfaces with ETS's OSA system which provides many of the administrative capabilities of the present invention. While the preferred embodiment utilizes ETS's OSA system, there are commercially available computer programs with enough functionality to generally practice the administrative functions provided by OSA for the present invention. One example is Sylvan's Administrative System.

The preferred embodiment of the delivery subsystem is designed to be interoperable with OSA, and could probably be made so with other test administration computer systems. Additionally, this preferred embodiment has the capability of compressing the candidate's solution with reference to the script and passing this to OSA.

INTERFACE

Description of Common Tools

Figure 3:
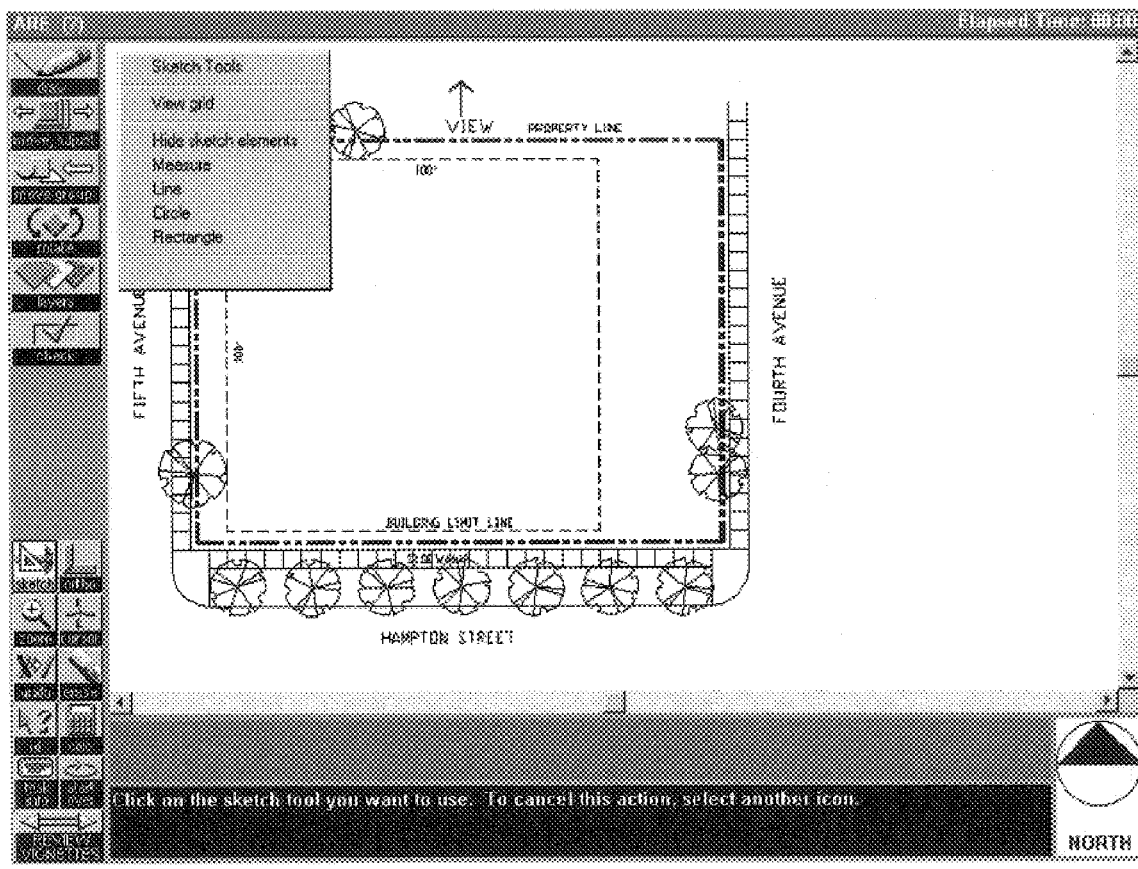
FIG. 3 shows the display screen, for the Schematic Design Vignette of a preferred embodiment of the present invention, after the Sketch Icon Tool has been selected.

Common tools provide the candidate with a method for sketching various lines, curves and geometric objects. Geometric objects created with these are not considered in determining a candidate's score. Clicks refer to depressing and releasing one of the mouse buttons or if a pointer is being used, the key/bar used in conjunction with the pointer. In one embodiment of the present invention the tools appear on the left hand side of the display screen. See FIG. 3.

Sketch Icon Tools.

Figure 4:
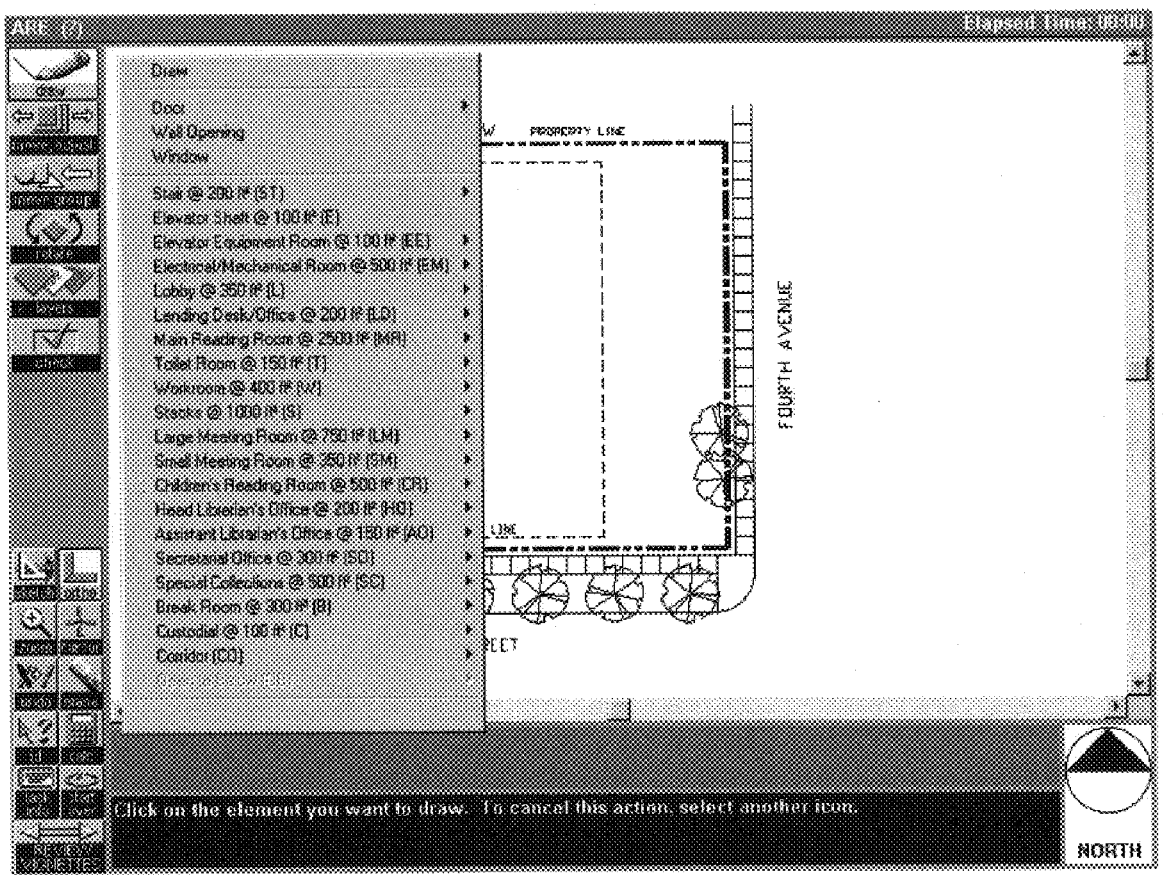
FIG. 4 shows the display screen, for the Schematic Design Vignette of a preferred embodiment of the present invention, after the Draw Icon Tool has been selected.
Figure 5:
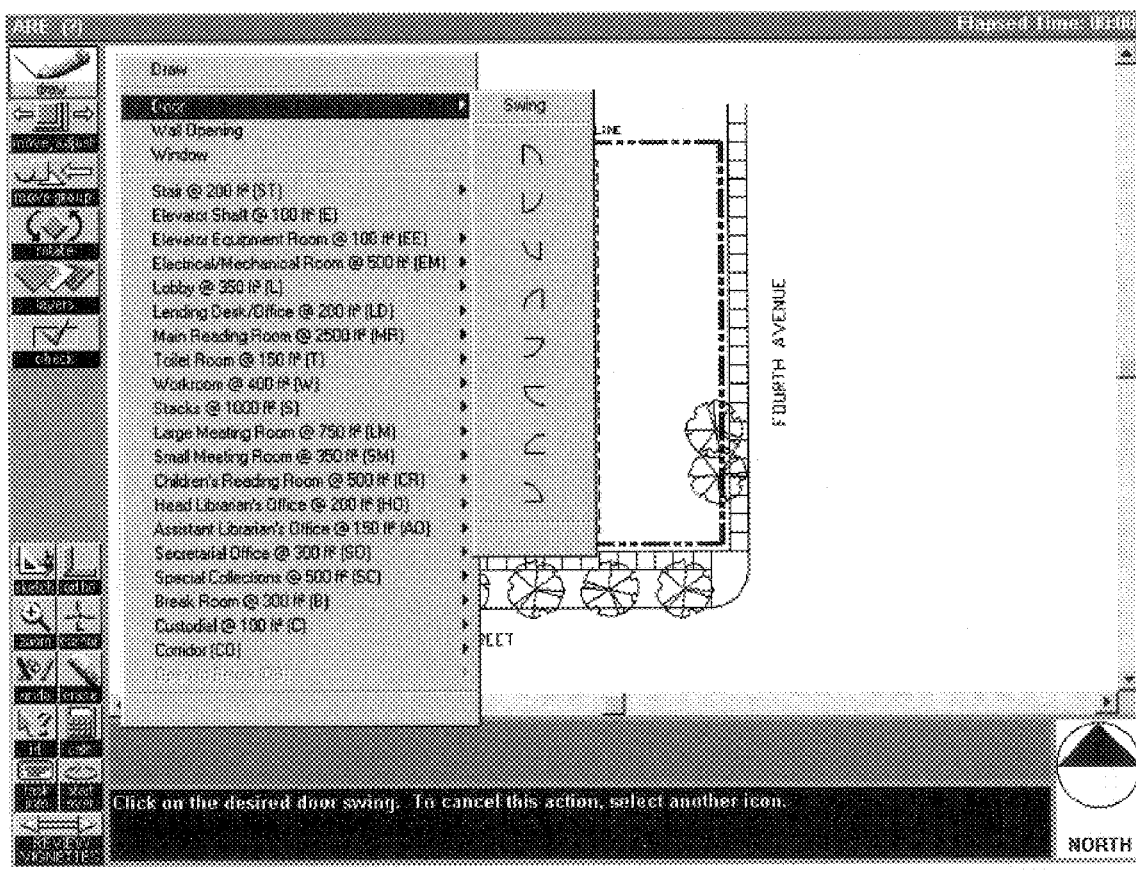
FIG. 5 shows the display screen, for the Schematic Design Vignette of a preferred embodiment of the present invention, where, first, the Draw Icon Tool has been selected and second, the Door entry on the Draw menu has been selected.
Figure 6:
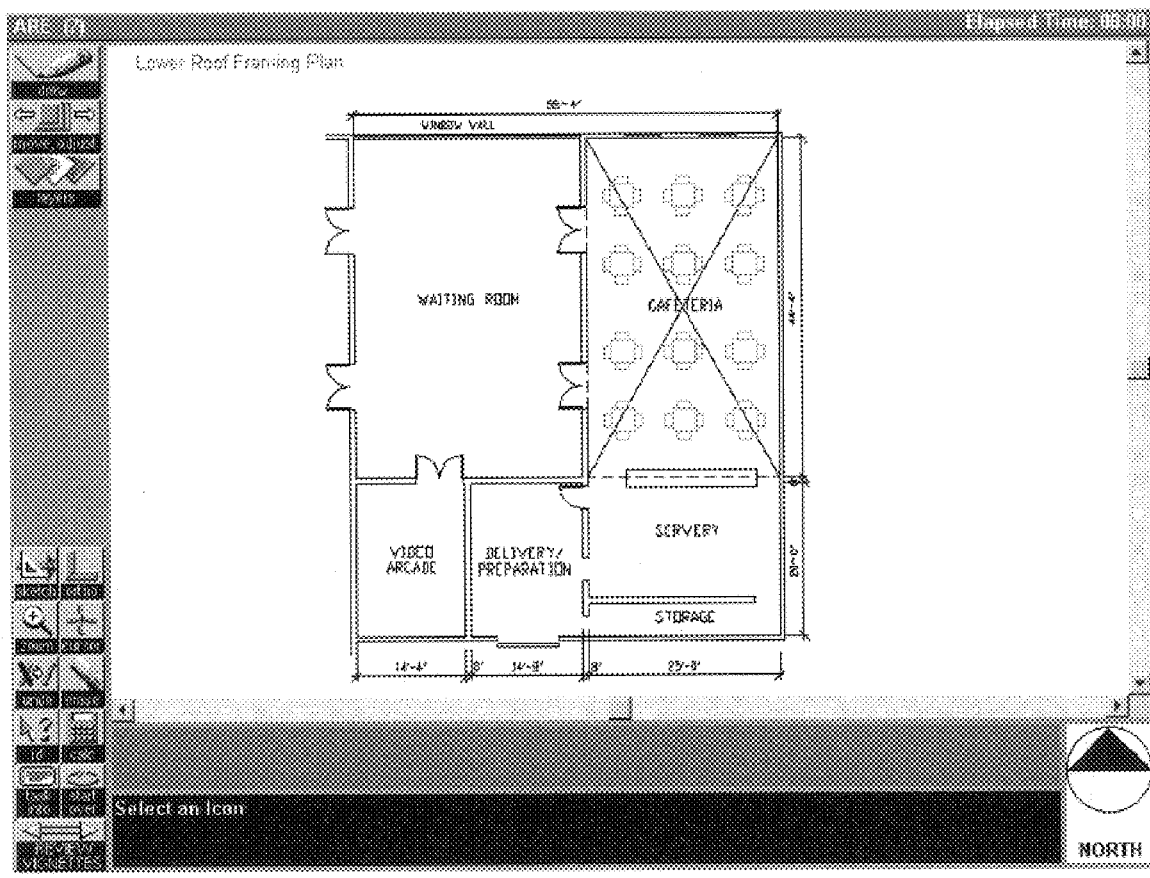
FIG. 6 shows the display screen for the Schematic Structural Design Vignette of a preferred embodiment of the present invention.
Figure 7:
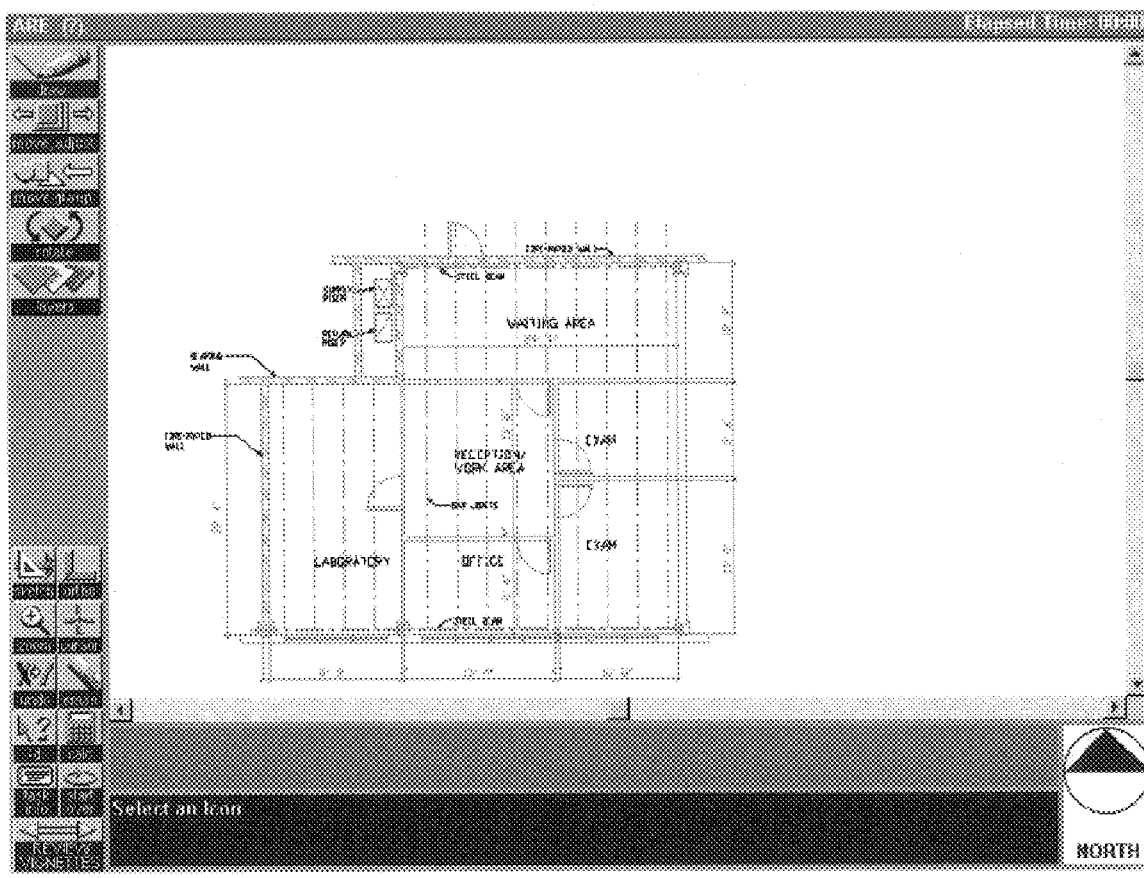
FIG. 7 shows the display screen for the Mechanical and Electrical Plan Vignette of a preferred embodiment of the present invention.
Figure 8:
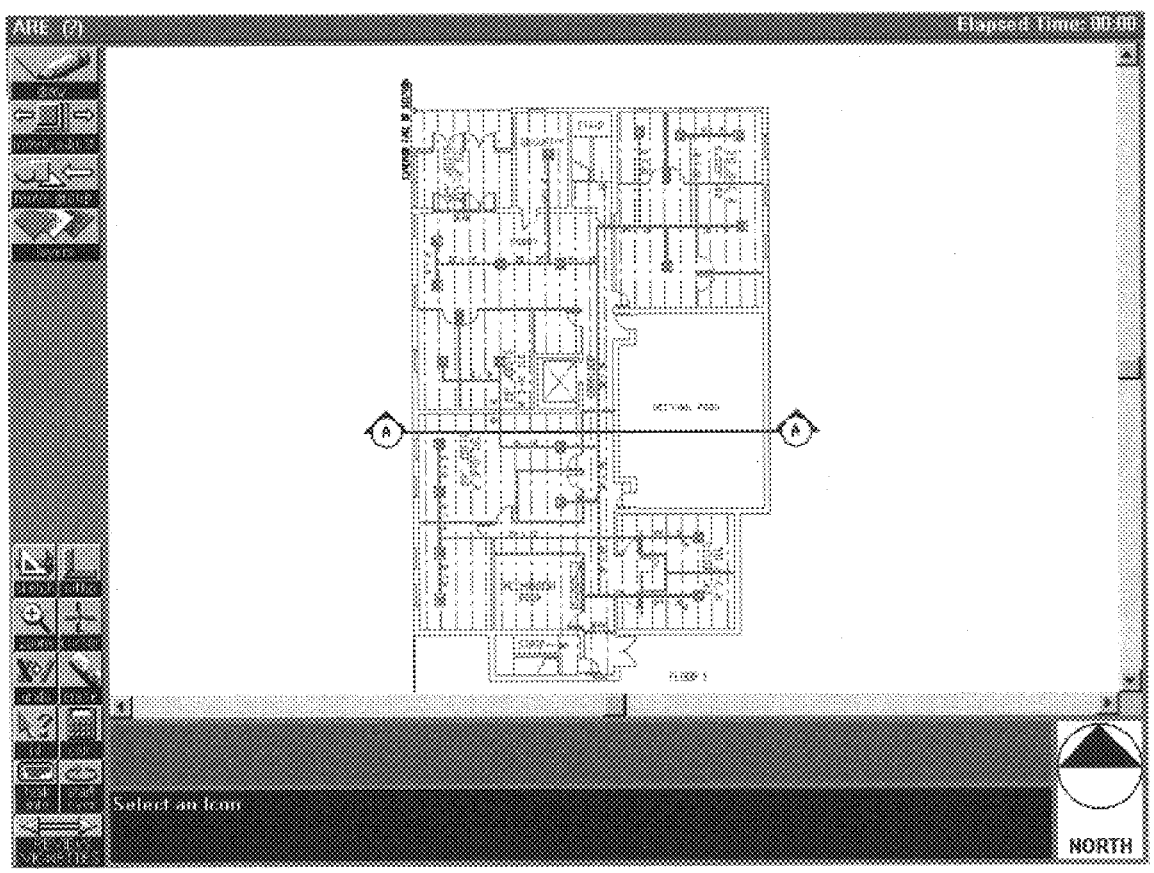
FIG. 8 shows the display screen for the Building Section Vignette of a preferred embodiment of the present invention.
Figure 9:
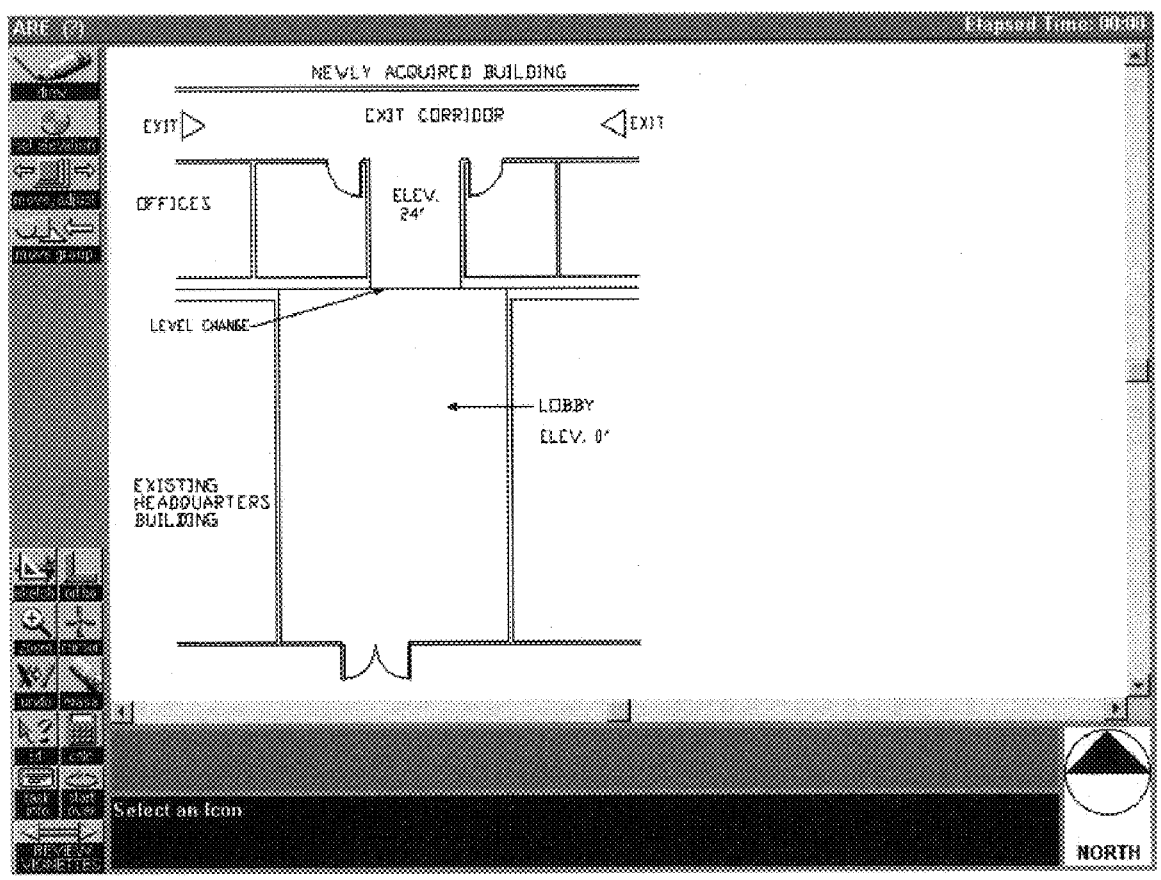
FIG. 9 shows the display screen for the Accessibility—Ramp Vignette of a preferred embodiment of the present invention.

The candidate can access the following drawing aid tools by selecting the icon entitled "sketch", which activates the "Sketch Tools" tool bar as shown in FIG. 4. See also FIG. 5.

VIEW GRID/HIDE GRID: Displays and hides light gray grid (not always available).

HIDE SKETCH ELEMENTS: Toggles sketch layer elements on/off.

MEASURE: Gives the candidate the ability to measure distances, by clicking on 2 points (click to specify start and end points), in either feet and inches or meters, depending upon which system of measurement is being employed in the particular examination.

LINE: Draws sketch lines by clicking to specify the start and endpoints of the line.

CIRCLE: Draws circles by clicking to specify the center of the circle, then another click to specify the radius.

ORTHO Icon Tool.

The orthogonal tool forces all lines or polylines to be drawn horizontally or vertically, but not diagonally.

ZOOM Icon Tool.

When the candidate has selected the ZOOM icon tool, he/she can then select an area of the screen he/she wants to magnify by clicking once on the drawing to specify the start point, and clicking a second time to specify the end point of the zoom box. The magnification of the zoom depends on the size of the zoom box. A smaller box gives the candidate greater magnification than a larger box.

CURSOR Icon Tool.

The candidate by selecting the cursor icon tool can toggle between an AutoCAD®-style cross-hair cursor and a small cursor.

UNDO Icon Tool.

Clicking on this icon allows the candidate to undo the last change they made to their solution. Clicking a second time restores the last change.

ERASE Icon Tool.

The candidate selects this icon, then selects a drawn or placed object(s), by clicking on the erase icon tool again the object(s) are erased.

ID Icon Tool.

The Id icon tool when selected displays the name and/or the dimensions of all placed and drawn objects. The candidate selects this icon, then selects a drawn or placed object. The requested information will be display in the Information Window.

CALC Icon Tool.

When the candidate selects the Calc or calculator icon tool, a calculator is displayed on the screen. The displayed calculator performs the mathematical calculations necessary to respond to the requested task. Such functions include sine, cosine, tangent, arcsine, arccosine, arctangent, etc.

TASK INFO Icon Tool.

Selection of the Task Info icon tool, enables the candidate to toggle back to the Task Information screen discussed below. It functions the same as hitting the spacebar.

Start Over Icon Tool.

Selecting the start over icon tool clears the drawing completely and allows the candidate to begin anew.

REVIEW Icon Tool.

The Review icon tool has two functions, it is used first, to both exit out of the vignette and proceed to the next test vignette, if any, and second, to review a prior vignette. (Another embodiment of the present invention uses a "Done" icon tool which only permits the first function.) If the candidate selects the Review icon tool once, the message in Information Window provides the candidate with a second chance to stay in the vignette by selecting any other icon, or to click on the Review icon tool again to exit to the next vignette or from the examination.

Description of Unique Tools

The following tools appear on one or more vignettes and each of the tools listed below can be found in various combinations throughout all vignettes. See FIG. 3.

CHECK Icon Tool.

Selecting this icon brings up a menu of options that may include:

CHECK OVERLAPS:

This tool is used to detect any overlapping elements, for those vignettes which allow for this check. Since some vignettes allow the candidate to provide a response with overlapping elements, in one preferred embodiment this tool would not be available on those vignettes. In one preferred embodiment, overlapping elements appear in pink.

CHECK CUT TREES:

When elements are placed over existing trees, the trees are flagged as "cut trees" when this icon is selected.

DRAW Icon Tool.

Selecting this icon brings up a menu that displays lists and sub-lists of items to be placed or drawn, such as buildings, trees, roads, grades, parking spaces, rooms, etc. In the preferred embodiment of the present invention, this tool is available except for B3 Grading (see FIG. B3).

MOVE, ADJUST Icon Tool.

This tool is used to move and adjust placed or drawn objects. The candidate selects this icon, if he/she clicks while the cursor is on an edge of a drawn object and drags the cursor across the screen, the size of the object will adjust accordingly. But if the candidate selects this icon, then clicks when the cursor is within the object and drags the cursor across the screen, it will move the drawn or placed object as a whole.

MOVE GROUP Icon Tool.

This tool allows the candidate to move more than one placed or drawn object at a time, while retaining their alignment and placement. The candidate selects this icon, then click on the objects he/she wants to move, then clicks on Move Group again to move them.

ROTATE Icon Tool.

This tool is used to rotate placed or drawn objects. In one preferred embodiment of the present invention, the tool rotates some objects in 90-degree increments; rotates others in 15-degree increments.

LAYERS Icon Tool.

Selecting this icon brings up a menu that lists the various layers of information that can be turned on/off, that is, displayed or not displayed. Options on this menu are variable with each vignette and may include:

HIDE BUILDABLE AREA:

This allows the candidate to temporarily hide a buildable area that he/she drew.

HIDE SECONDARY CONSTRUCTION AREA:

This allows the candidate to temporarily hide a secondary construction area.

HIDE SITE:

Hides entire base drawing.

HIDE OTHER FLOOR:

Hides either floor 1 or floor 2.

SET ROOF Icon Tool.

This icon tool allows the candidate to define a roof plane by setting slope direction, slope ratio, elevation vertex, and elevation value. This icon is selected after plane is drawn. The following features are available after the "Set Roof" icon is selected:

Slope Direction: "The way the water falls." The arrow points in the direction the roof plane slopes. To set slope direction, the candidate clicks on Set Roof, then clicks on slope arrow until desired direction is achieved. In one preferred embodiment, each click rotates arrow 45 degrees. Slope Ratio: Rise:Run. This ratio defines the height that the roof plane will rise, per specified horizontal distance across. To set the slope ratio, the candidate clicks directly on slope ratio displayed within the plane.

Elevation Vertex: This is the vertex of the plane for which the elevation is assigned. By clicking on any point within the plane (except on slope arrow, ratio or elevation value), the location of the vertex will move clockwise by one vertex.

Elevation Value: Allows setting the elevation of the plane at the elevation marker. This is the height of the plane at a given vertex. The value is entered in feet and inches (when the English system is used), by moving up/down arrows to desired value. To enter value, the candidate clicks on displayed elevation value. Elevations for all other vertices are automatically calculated.

Icons for Another Embodiment

Another embodiment of the present invention has the following icon tools in addition to some or all of the preceeding ones.

DONE Icon Tool.

The DONE icon tool is used to exit out of the vignette and proceed to the next test vignette, if any. If the candidate selects it once, the message in Information Window provides the candidate with a second chance to stay in the vignette by selecting any other icon, or to click on the DONE icon tool again to exit to the next vignette or from the examination.

OPTIONS Icon Tool.

Selecting this icon brings up a menu of options (variable with each vignette) that may include:

1. CHECK OVERLAPS:

Used to check overlapping elements. In one preferred embodiment, overlapping elements appear in pink.

2. CHECK CUT TREES:

When elements are placed over existing trees, the trees are flagged as "cut trees" when this icon is selected.

3. HIDE BUILDABLE AREA:

This allows the candidate to temporarily hide a buildable area that he/she drew.

4. HIDE SECONDARY CONSTRUCTION AREA:

This allows the candidate to temporarily hide a secondary construction area.

5. HIDE SITE:

Hides entire base drawing.

6. HIDE OTHER FLOOR:

Hides either floor 1 or floor 2.

7. SET ROOF:

Allows the candidate to define a roof plane by setting slope direction, slope ratio, elevation vertex, and elevation value. This icon is selected after plane is drawn. The following four (4) features are available after the "Set Roof" icon is selected:

8. Slope Direction: "The way the water falls." The arrow points in the direction the roof plane slopes. To set slope direction, the candidate clicks on Set Roof, then clicks on slope arrow until desired direction is achieved. In one preferred embodiment, each click rotates arrow 45 degrees.

9. Slope Ratio: Rise:Run. This ratio defines the height that the roof plane will rise, per specified horizontal distance across. To set the slope ratio, the candidate clicks directly on slope ratio displayed within the plane. Elevation Vertex: This is the vertex of the plane for which the elevation is assigned. By clicking on any point within the plane (except on slope arrow, ratio or elevation value), the location of the vertex will move clockwise by one vertex.

10. Elevation Value:

Allows setting the elevation of the plane at the elevation marker. This is the height of the plane at a given vertex. The value is entered in feet and inches (when the English system is used), by moving up/down arrows to desired value. To enter value, the candidate clicks on displayed elevation value. Elevations for all other vertices are automatically calculated.

11. SWITCH FLOORS:

Used to toggle between floors 1 and 2.

12. MOVE ELEVATION MARKER:

Used to move the elevation marker from vertex to vertex.

ROTATE SITE Icon Tool.

This tool is used to rotate the entire site.

ROTATE SKYLIGHT Icon Tool.

This tool is used to rotate a skylight already in place. In one preferred embodiment, it rotates the skylight in 90 degree increments.

VIEWING WINDOWS

Information Window.

The Information Window, is used to inform the candidate of object names, sizes of objects, and distances between objects. It is also used to warns candidates before they carry out potentially destructive commands such as "erase", "start over" and/or "review".

Help Window.

The Help Window is used to inform the candidate of what actions are available at any given time. As the candidate works through interactions that require on or more clicks, the Help Window is updated to inform them what they can do next. In one preferred embodiment of the present invention, it is horizontally oriented along the bottom of the screen.

Work Window.

The Work Window, is the large window in the center of display screen. It shows the initial template picture onto which the candidate enters his or her solution. The initial picture may contain site features that the candidate must take into account when planning his or her solution, including existing trees, roads, protected wetlands, or bordering properties. See for example, FIG. 2.

Task Information Screen.

Selection of the Task Info icon tool, enables the candidate to toggle back to the Task Information Screen. The task information screen provides the name of the vignette as well as links (areas to click on) to the informational screens. Once at an informational screen clicking on the INDEX icon takes the candidate back to the Task Information Screen.

Informational Screens

Vignette Directions Screen.

See, for example, FIG. VIGNETTE DIRECTIONS. Program Screen.

See, for example, FIG. PROGRAM.

Tips Screen.

See, for example, FIG. TIPS.

General Test Directions Screen.

See, for example, FIGS. GENERAL TESTa and GENERAL TESTb.

SOLUTION SCORING SYSTEM

Scoring Method Generally

In one preferred embodiment of the present invention, the test consists of three divisions. Each are composed of three to six vignettes. Each vignette addresses a number of tasks or knowledge skills, and abilities related to building and site design that were identified by a task analysis of the field of architecture. The vignettes of the present invention thoroughly cover the areas designated as most important by the task analysis. In a preferred embodiment of the present invention, each candidate taking a vignette is likely to receive a different problem from a pool of psychometrically equivalent problems.

The site design vignettes look remarkably similar to those found in the paper-and-pencil test. The interface between the candidate and the computer was designed with the computer novice in mind. The candidate may interact with the vignette through the use of a computer mouse or other pointing device or the keyboard. The candidate chooses tools such as "Draw" or "Move" by selecting icons on the computer screen.

The simulations that test skills in building and site design require the availability of many materials, such as programs, codes, drawings, and other resources usually found in an architect's office. The computer-based test of the present invention provides the essential materials to the candidate, as needed, at the click of an icon or the press of the keyboard space bar.

Decomposition.

In order to score a vignette, the candidate's solution must be decomposed and then analyzed so a score can be assigned. Decomposition is another way of saying that the graphic response of the candidate is represented in mathematical terms suitable for analysis.

Decomposition for simulations of the present invention is much different than that for figural response. In figural response the system need only check for the presence of the correct response. Whereas in simulations of the present invention the system must be able to deal with an almost infinite number of responses.

Vignette scoring systems in accordance with the present invention will generally include, depending on the particular vignette and to a greater or lesser extent, the following features, some of which may overlap in functionality. Vignette scoring systems may:

1. Assess completeness of the candidate's response by verifying that the candidate has performed all required operations. This is often done as part of a "fatal flaw" check.

2. Determine grammatical correctness (or design grammar) of the solution by verifying that the candidate has respected all of the vignette's program constraints in the responses. A failure to be grammatically correct will generally constitute a "fatal flaw" and result in an unacceptable score for the vignette.

3. Identify superfluous response components, in those cases where the interface permits superfluous responses, by examining the response of the candidate for unnecessary or ineffective action.

4. Verify satisfaction of the test program by examining the response of the candidate for compliance with the requirements of the vignette.

5. Check technical correctness by assessing the response of the candidate for satisfaction of the technical requirements associated with the vignette, for example, code compliance.

6. Evaluate the efficiency and design logic by determining the level of skill and ability of the candidate as exhibited by the quality and efficiency of the solution.

Scoring Trees.

Figure 10:
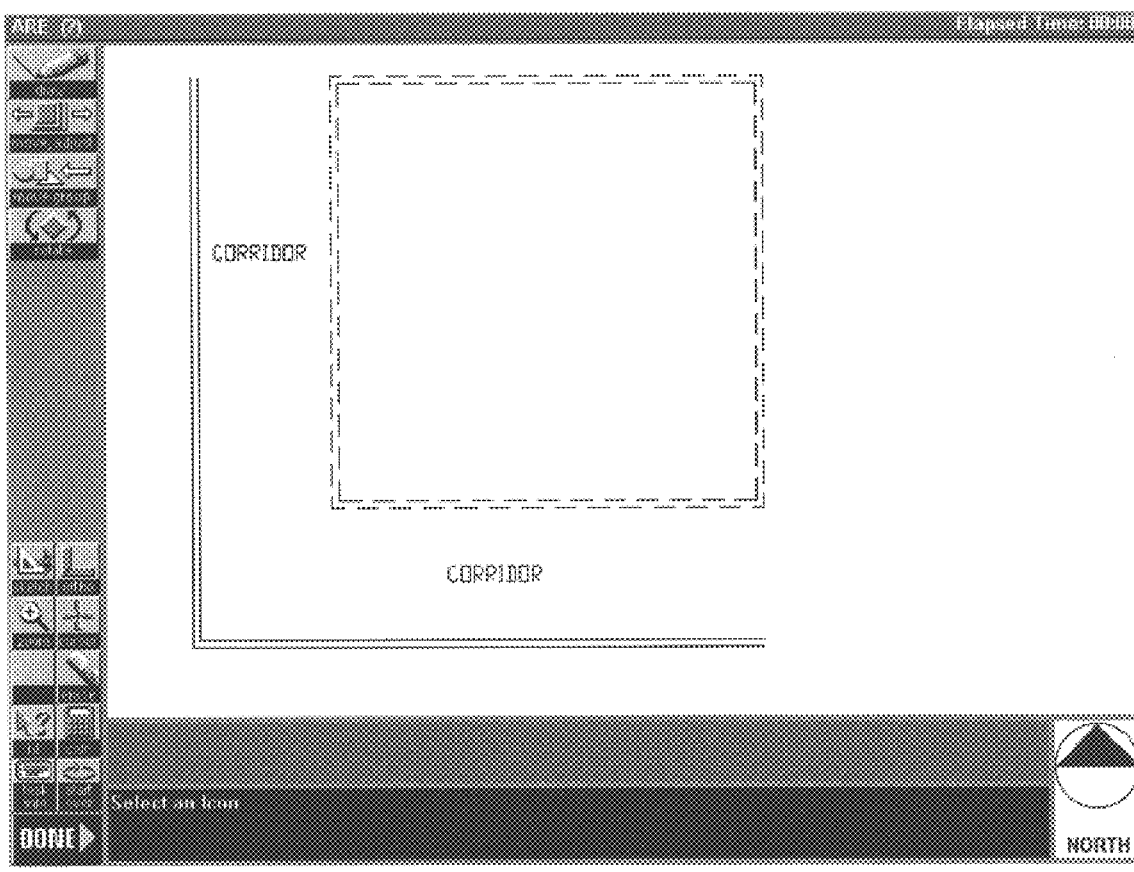
FIG. 10 shows the display screen for the Accessibility—Toilet Room Vignette of a preferred embodiment of the present invention.

The scoring method relies on a knowledge elicitation and representation approach developed by one of the co-inventors of the present invention. The method produces a treelike or hierarchical organization of problem features needed to characterize performance on a problem class or vignette type. As an illustration consider the design problem of planning a bathroom displayed in FIG. 10.

This is what the candidate would see on the computer screen with the icons on the left serving as the interface for the candidate to enter and solve the problem. By pressing the space bar on the computer keyboard or by selecting the Task Info icon the candidate can refer to the problem to be resolved as well as access relevant reference material. Clicking on the Draw icon offers the candidate a menu of design objects that can be placed in the solution, such as a bathtub, toilet, etc. The other icons allow the candidate a series of actions to refine the solution, such as moving and rotating the different design elements.

Scoring trees are formulated initially as a top-down process where the relevant professional, for example, architects, based on their experience grading open-ended problems in the paper-and-pencil test, formulate broad categories that characterize the solution to a type of problem. The broad categories, for example, design logic, are not directly computable from the representation of a solution and, therefore, need to be fleshed out into more basic characterizations that are, in fact, computable. The process is arduous and it involves, in addition to the relevant professional, computer scientists and test developers. The inventors have found that a hierarchical tree representation is both a natural and convenient form of knowledge elicitation.

Scoring Tree Nodes, Clusters, Features and Classifications.

There are basically two types of nodes in the scoring tree hierarchy. One type consists of low-level features requiring a direct computation from the solution, such as computing the location of an element, the distance between design elements, or counting the presence or absence or some elements. The outcome of each feature is a classification into one of four categories: Acceptable (A), Indeterminate (I), Unacceptable (U) and Fatal (F). Initially the thresholds for the categories are set judgmentally, based on the collective expertise of the professionals, for example, architects involved in the project. As data is collected, however, the thresholds are revisited and adjusted as necessary. The system and method of the present invention may also use the following category: Special Processing Required (Q), which is a sort of quality control feature indicating that human oversight may initially be necessary when scoring a particular feature.

The second type of node consists of clusters of lower-level features. Again, the lower level clusters are subsumed under a given higher cluster which is already completed. Indeed, the computation of a vignette score proceeds from the computation of the lower-level features upward in the order dictated by the tree.

Scoring Matrices.

All possible values for a cluster can be represented by a two-dimensional matrix where the rows refer to the number of I's and the columns refer to the number of U's.

The matrix approach to summarize scores is a convenient format to rank the feature cluster measures, and locate tuples to identify the combinations associated with an A, I or U score. The initial process is modified or revisited each time there are changes in problem specifications or other information. Data collected from field trials can be used to suggest further changes. For example, some features may be found not to function well, or be ambiguously defined, or computationally infeasible as originally conceived. Any potential changes are considered very cautiously because all the other instances of the vignette type must be considered in order to avoid the introduction of instance-specific scoring considerations. Occasionally, from such considerations emerges a need to revise the specifications. For example, the initial specifications for the vignette type concerned with lighting and ventilation allowed for the possibility of one or two air supplies and returns. After data was collected on this vignette type, this flexibility was found to be problematic and eliminated.

Scoring Method Particulars for Architects Examination

In a typical vignette exercise, the salient features of a candidate's solution are extracted and promulgated through a hierarchical or "tree-like" scoring structure from which a score for the solution is generated. For example, see FIG. 11, which is the scoring feature tree for the Accessibility Toilet Vignette. This tree structure is composed of several critical primitive features, each of which feeds into a higher order feature—called a cluster or sub-cluster—which in turn feeds into either a higher order cluster or the vignette's title cluster." See, NCARB, 1994, p. 1, the entirety of which is hereby incorporated herein.

Figure 11:
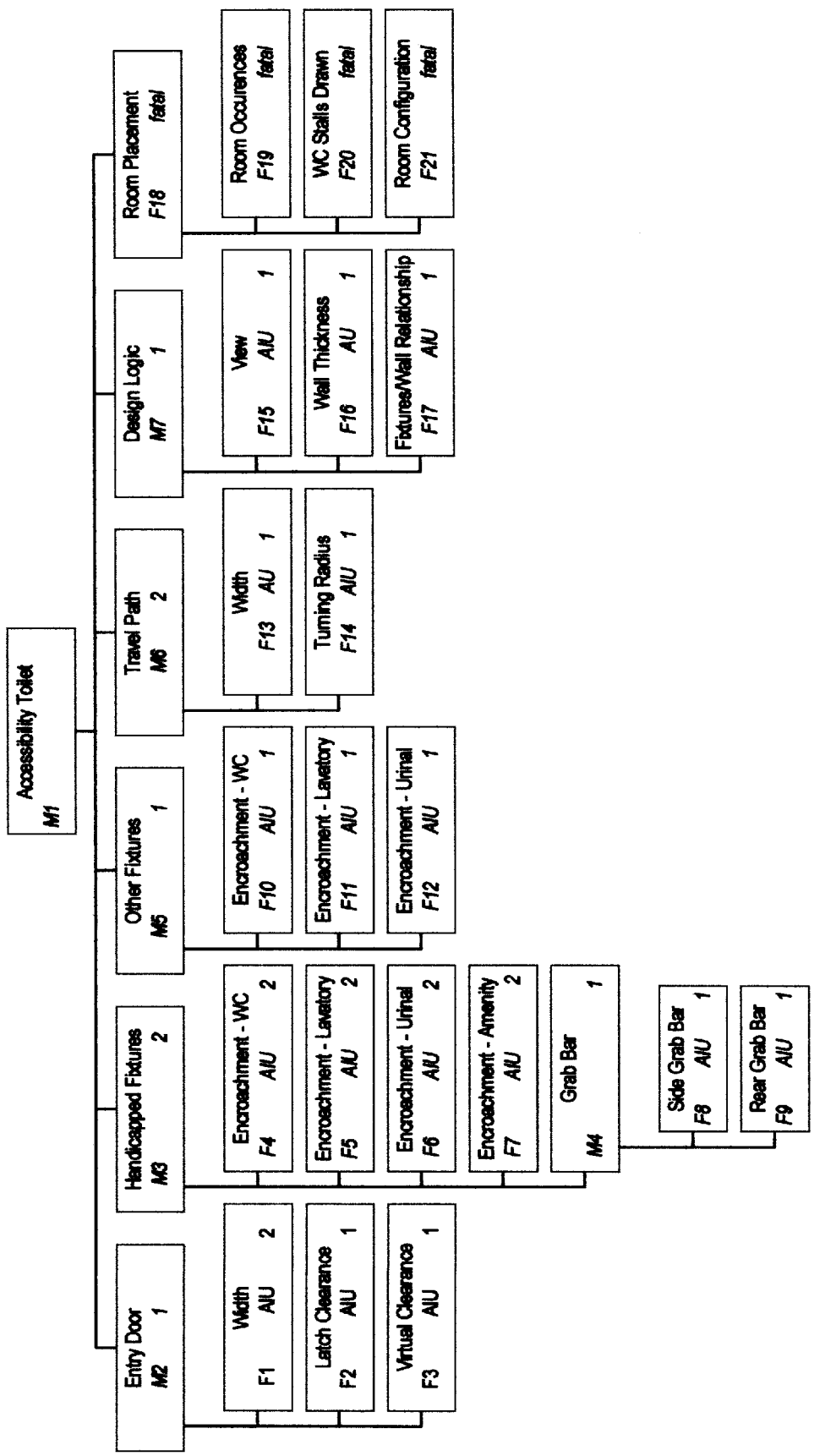
FIG. 11 shows the computer scoring decision tree for the Accessibility—Toilet Room Vignette of one preferred embodiment of the present invention.
Figure 17:
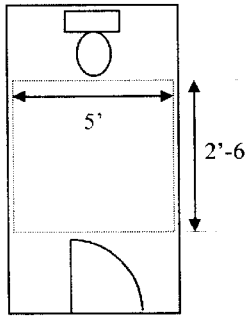
Figure 18:
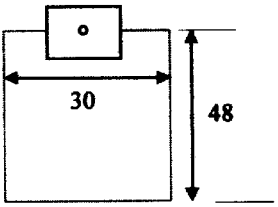
Figure 19:
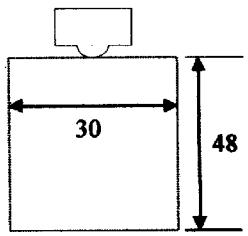
Figure 21:
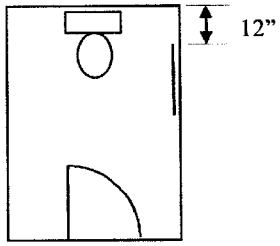
Figure 22:
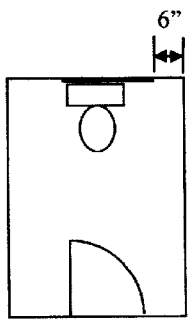
Figure 23:
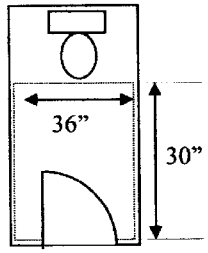
Figure 24:
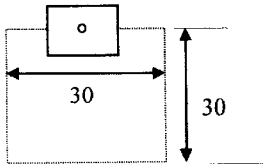
Figure 25:
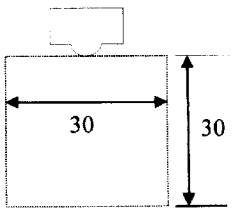
Figure 43:
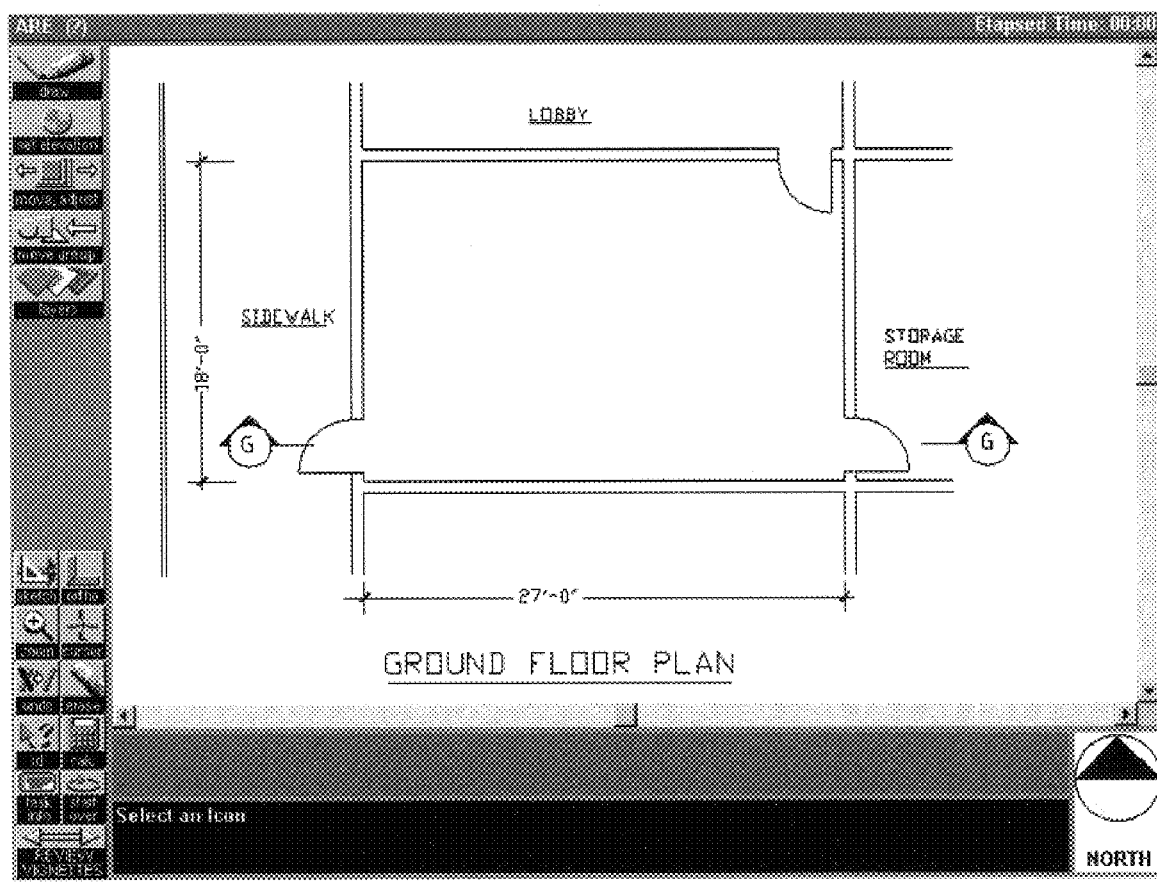
FIG. 43 shows the display screen for the Stair Design Vignette of a preferred embodiment of the present invention.
Figure 44:
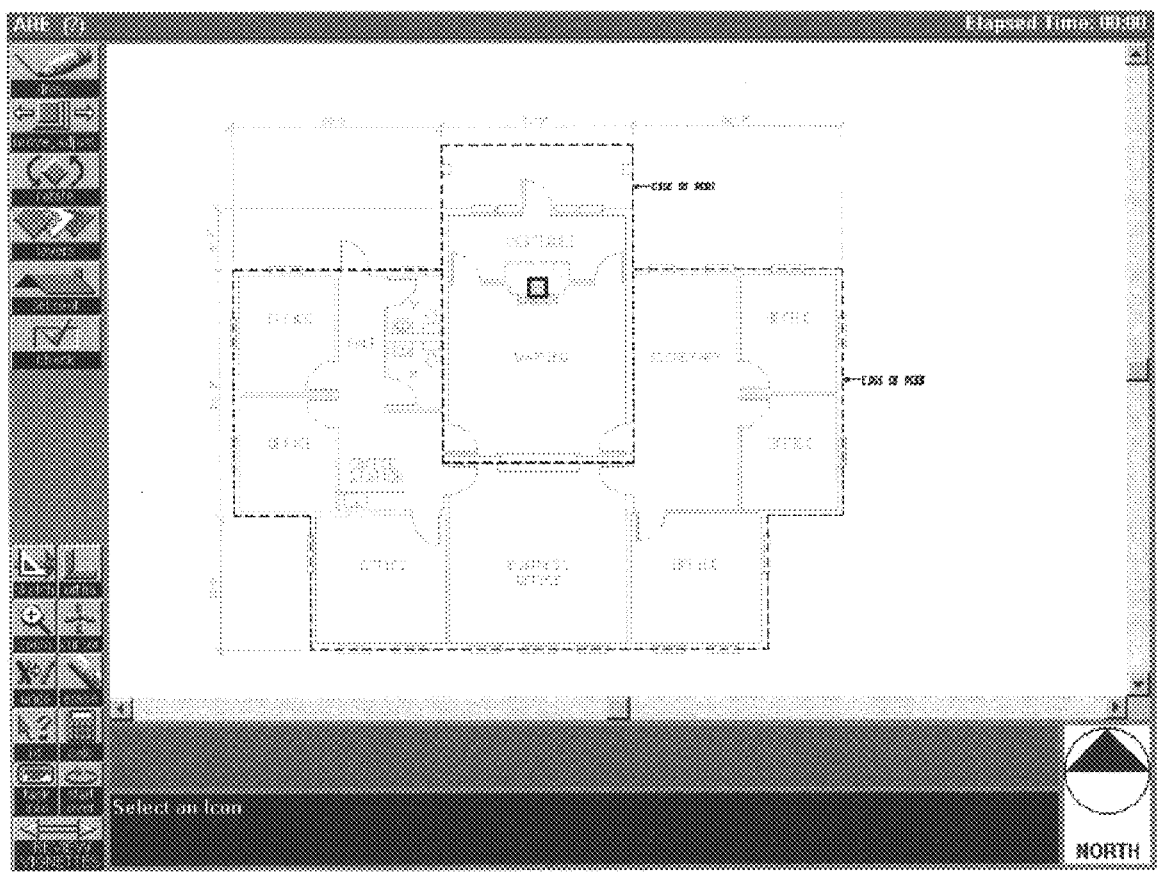
FIG. 44 shows the display screen for the Roof Plan Vignette of a preferred embodiment of the present invention.
Figure 45:
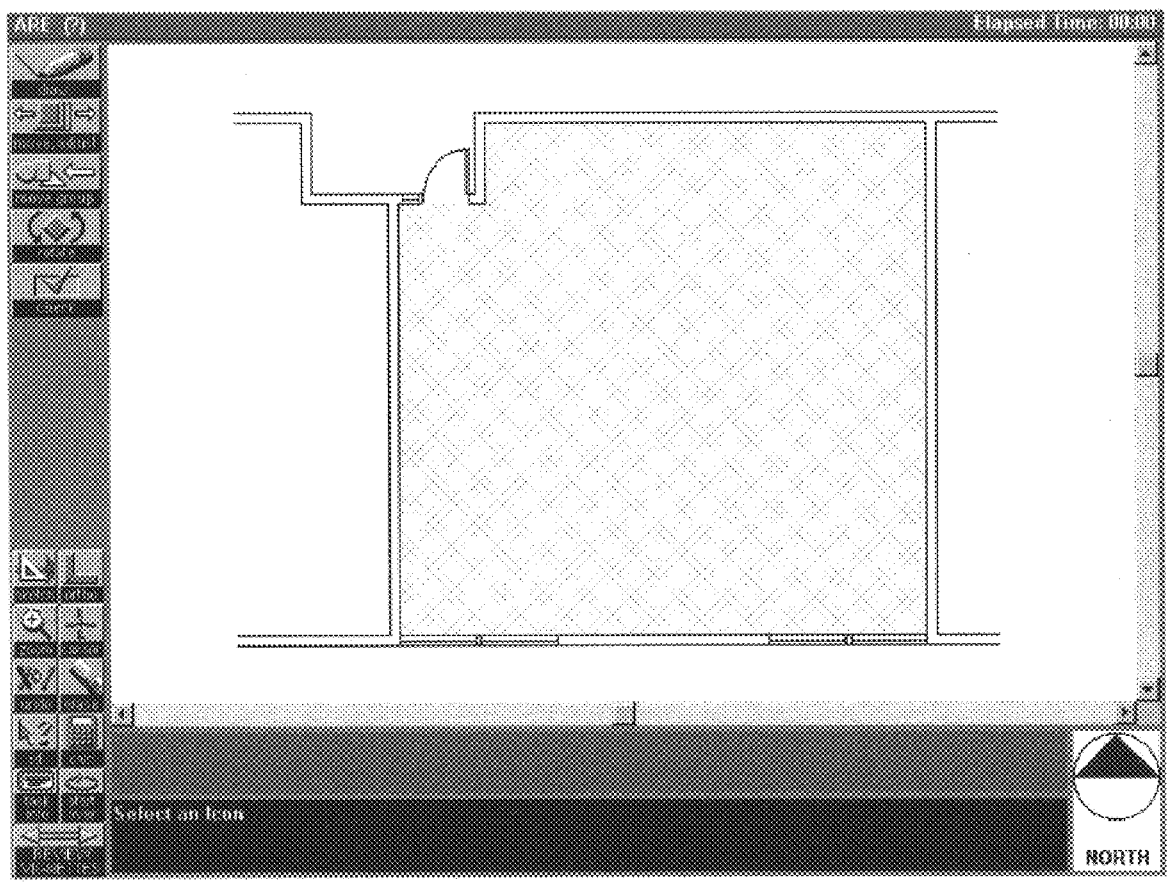
FIG. 45 shows the display screen for Interior Layout Vignette of a preferred embodiment of the present invention.
Figure 46:
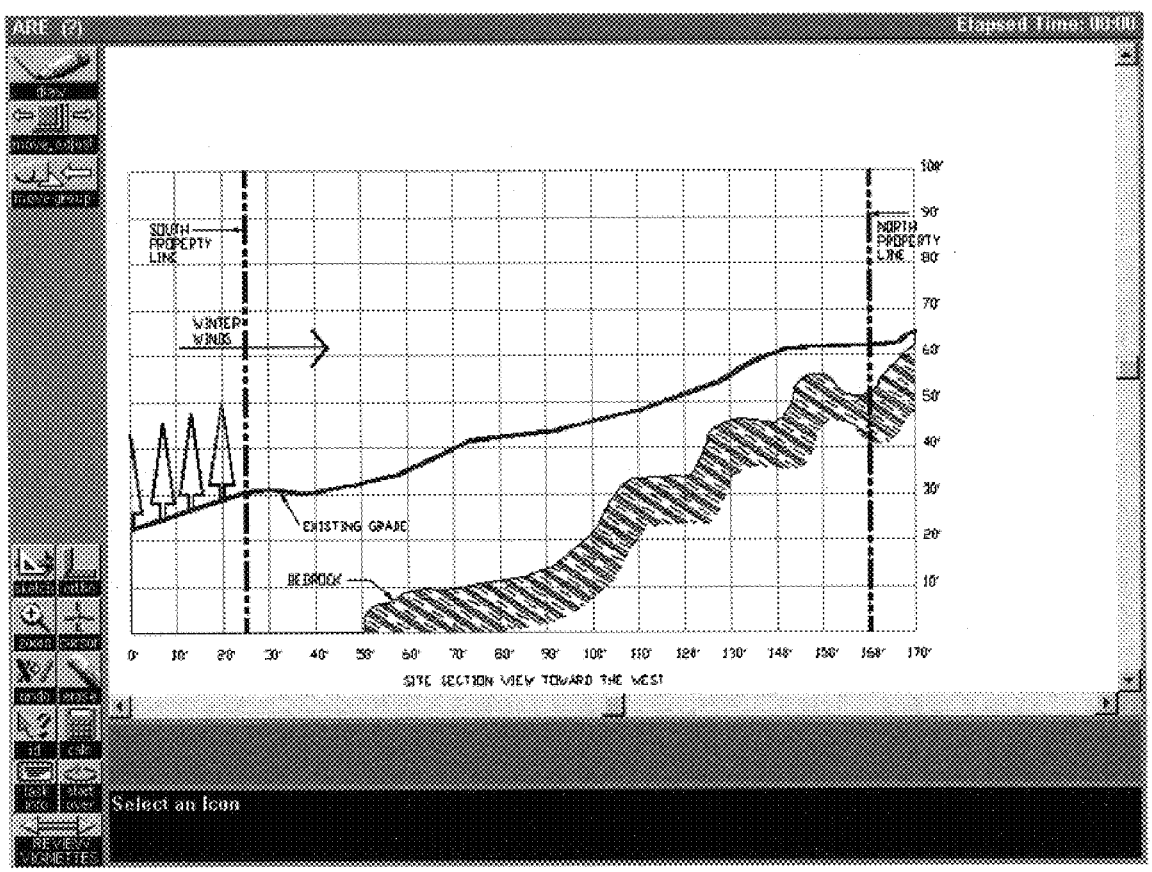
FIG. 46 shows the display screen for the Site Section Vignette of a preferred embodiment of the present invention.
Figure 47:
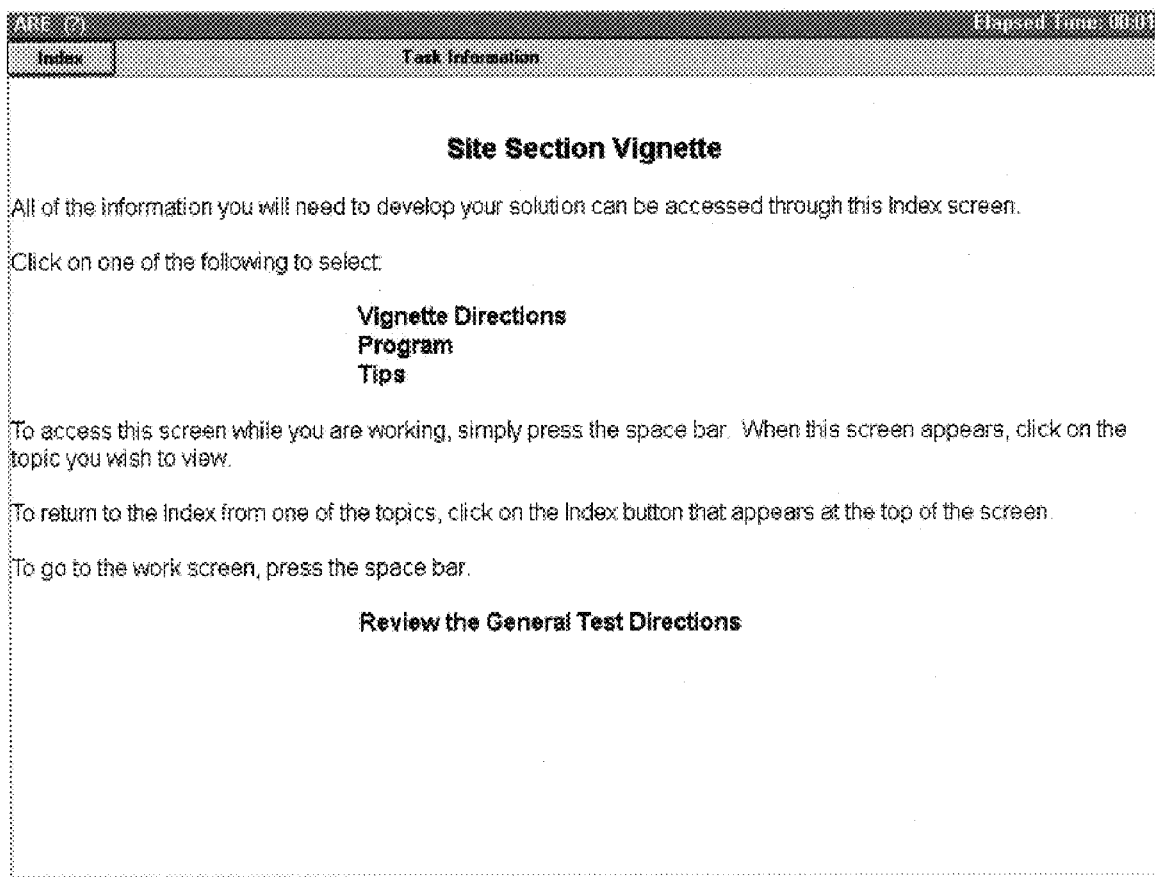
FIG. 47 shows the index screen for the Site Section Vignette of a preferred embodiment of the present invention.
Figure 48:
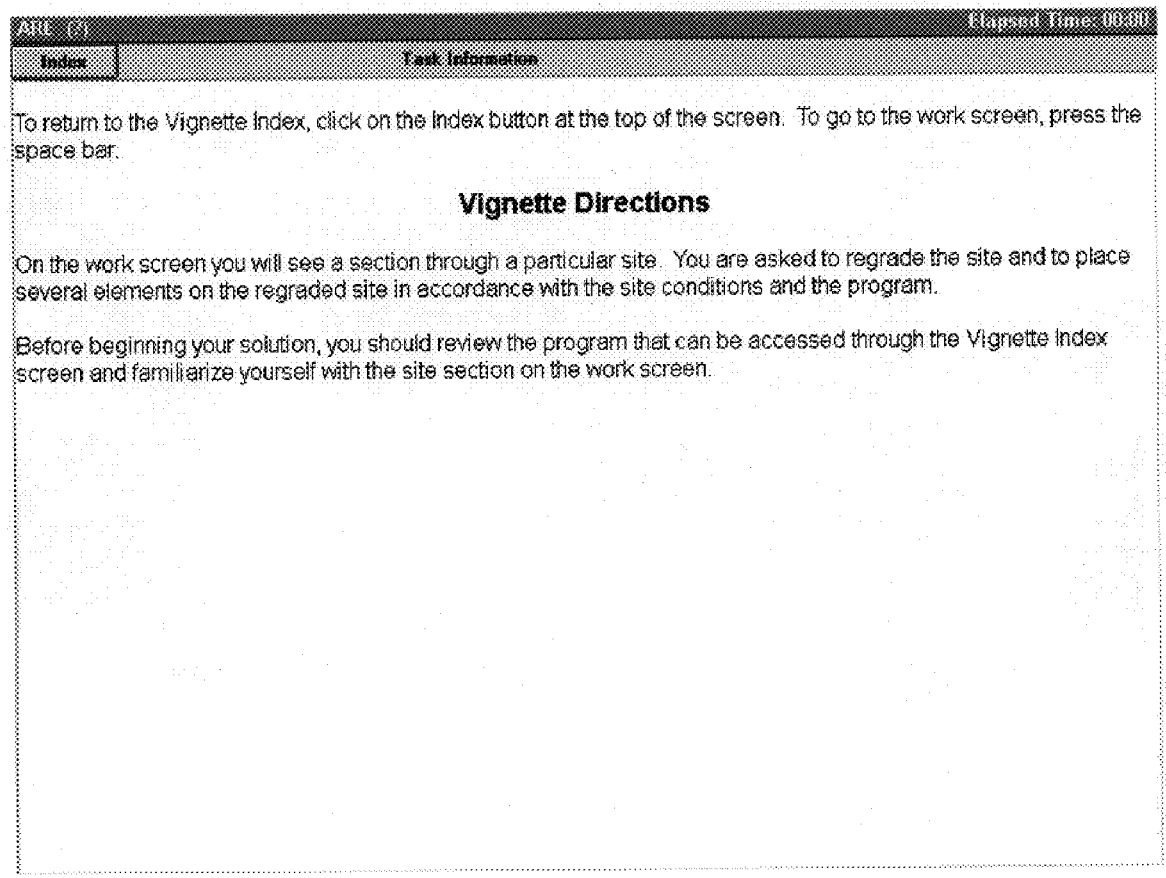
FIG. 48 shows the vignette directions screen for the Site Section Vignette of a preferred embodiment of the present invention.
Figure 49:
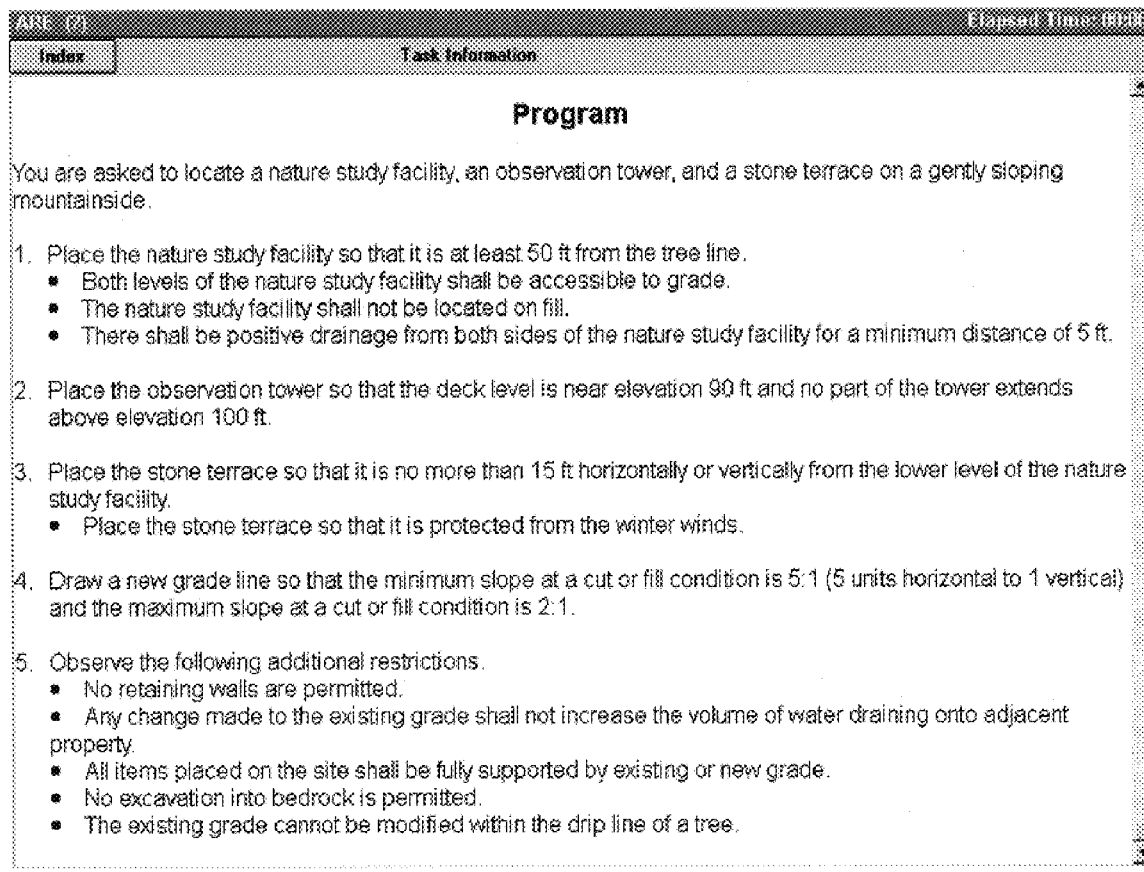
FIG. 49 shows the program screen for the Site Section Vignette of a preferred embodiment of the present invention.
Figure 50:
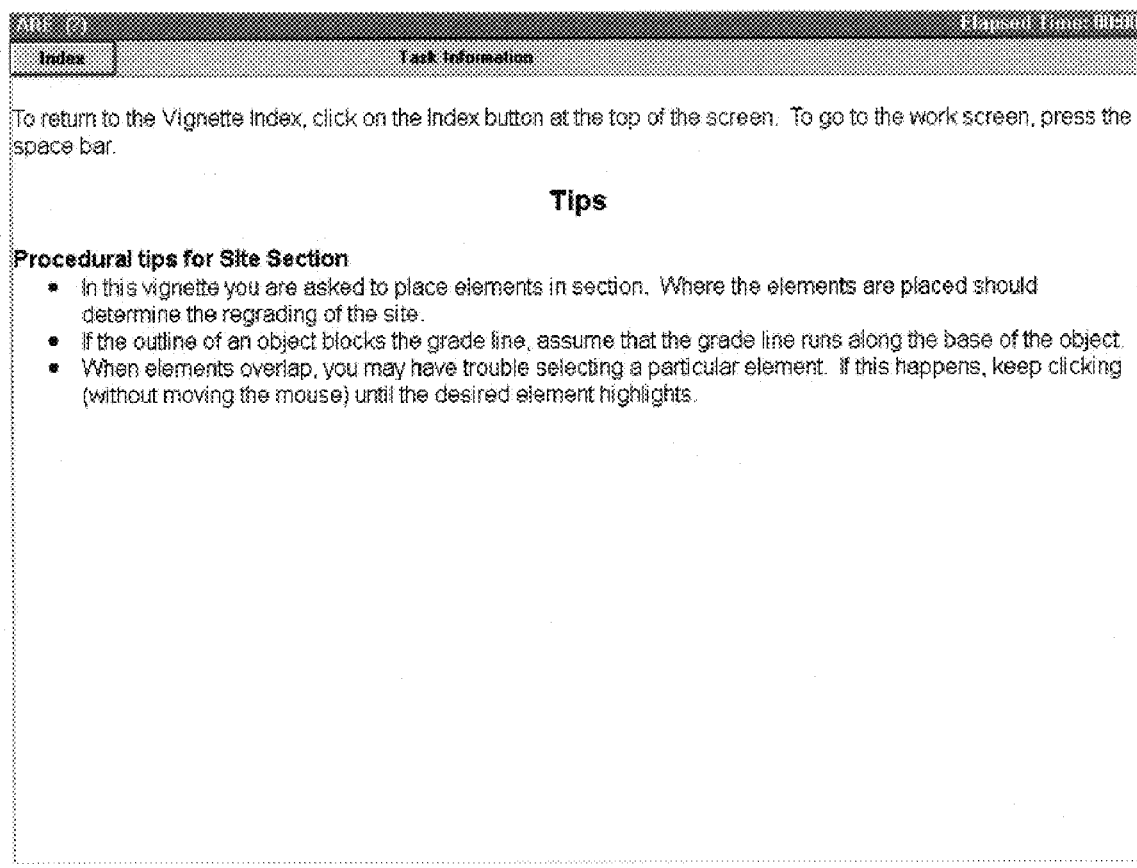
FIG. 50 shows the tips screen for the Site Section Vignette of a preferred embodiment of the present invention.

For example, as disclosed in FIG. 11, "Width" (Feature 1 (see FIGS. 12 and 13), weight 2, possible scores of (A), (I) or (U)), "Latch Clearance" (Feature 2 (see FIG. 14), weight (or multiplier) 1, possible scores of (A), (I) or (U)) and "Virtual Clearance" (Feature 3 (see FIG. 36), weight 1, possible scores of (A), (I) or (U)) are the critical primitive features, which feed into the higher order cluster "Entry Door" (Matrix 2 (see FIG. 36), weight 1), which in turn feeds into the vignette's title cluster the "Accessibility Toilet" (Matrix 1 (see FIG. 35). Some primitive features have possible scores of only (A) or (F). See "Room Configuration" Feature 21, FIGS. 11 and 34. While some primitive features have possible scores of only (A) or (U). See FIG. 11 regarding F13. However, note that in another embodiment, this feature has possible scores of (A), (I) and (U). See FIG. 26.

Extraction.

Scoring works by first reading feature requirements from an authoring file (see "SAMPLE AUTHORING FILE FOR ACCESSIBILITY-TOILET VIGNETTE" in the Source Code Appendix) and comparing the requirements against the data in a candidate's solution file. Second, running the feature checking subroutines and arriving at a score this is called "extraction". The scoring program generates a score of Acceptable (A), Unacceptable (U), Indeterminate (I) or Fatal (F) for each feature that it extracts. See FIGS. 11–34. See also FIGS. 57–61 for another embodiment of the present invention. The scoring program in another preferred embodiment may also generate a score of Special Processing Required (Q).

Matrix calculation.

Each individual feature that is scored belongs to a matrix, which is a collection of related features. See, for example, FIG. 62. For another example, the "wind", "solar" and "trees" features all might belong to the "environmental" matrix. Each feature in a matrix is assigned a weight in an authoring file which tells the scoring program how much that particular feature contributes to the score for that matrix. Each matrix has a ctut score associated with it that tells how many scores of an appropriately weighted (I) or (U) the underlying features of a matrix can have before the matrix score itself no longer qualifies as an (A) and must be scored as an (I) or (U). In one preferred embodiment, there are two cut scores, one between A and I and the other between I and U. The feature scores are weighted as described above before they are tallied. While a matrix is generally made up of features, it may also consist of other "sub"-matrices, each of which have their own features. See, for example, FIGS. 35–41. When all the features have been extracted and the matrix scores have been calculated they are aggregated into one overall score. This overall aggregation involves applying cuts and weights to each of the underlying matrix scores that have been calculated.

Authoring files (".aut").

Authoring files (".aut") contain information need for both delivery and scoring.

Certain authoring files contain feature criteria. These files answer questions such as: (i) if shading is required, how much shading is enough?; (ii) if two building elements must be "close" to each other, how far is too far for a score of "acceptable"?; or (iii) if there is a tolerance for imprecise drafting, how large is that tolerance? For an example of a delivery authoring file see, "SAMPLE AUTHORING FILE FOR ACCESSIBILITY-TOILET VIGNETTE" in the Source Code Appendix.

Scoring matrix files (".mtx").

Scoring matrix files contain matrix information. These files contain matrix information such as: (i) how much is a particular feature weighted, vis-a-vis other features in the matrix; or (ii) how many feature scores of (I) or (U) are necessary for the matrix to get an (I). See, for example, the B3S.MTX file in the Source Code Appendix which relates to the Site Grading Vignette.

Scoring Techniques.

In order to score solutions for certain vignettes, certain techniques had to be developed in order to represent the features of current and potential vignettes and the solution provided by the candidate in a fashion amenable for computer manipulation. Several computer methods were developed by one or more of the co-inventors of the present invention and they are described below.

A Computer Method For Determining If an Object Can Be Viewed From Another Object.

It is necessary in designing public structures to consider what can or cannot be seen from a specified building or other object, called the Source Object. In particular, an architect must consider the question of whether the Target Object is visible or obscured, depending on the desirability of seeing the Target Object. For example, an unobstructed view of a park may be desirable, whereas it may be preferable not to see a parking lot.

A two-dimensional computer method is disclosed in the program set forth at section VIEW SOURCE CODE of the Source Code Appendix for determining the percentage of the Target Object that is visible from one side of the Source Object.

For additional information the reader is directed to Reid-Green (1996d), which is hereby incorporated herein.

A Computer Method for Calculating Setback Polygons.

In architecture, a setback is an area, generally described by a fixed distance from a site feature--a building, road, lot line, etc.—inside which no structure may be built. A setback can be defined as the locus of all points which are a fixed distance outside or inside an arbitrary polygon.

For example, consider a site plan with existing structures such as buildings, driveways, etc., and the definition of various setbacks, for example, a setback of five feet from the edge of the site. Therefore any structure to be built on the site must be at least five feet away from all site boundaries. A computer implemented method to determine success in conforming to setback requirements must determine if any lines defining the new structure intersect any setbacks. To be consistent with the practice of approximating an arc by a series of connected line segments, it is necessary to provide a means to generate a polygonal approximation to a given polygon which is the setback to the given polygon.

The program set forth at section SETBACKS SOURCE CODE of the Source Code Appendix discloses one embodiment of this method.

For additional information the reader is directed to Reid-Green (1996c), which is hereby incorporated herein.

A Computer Method for Determining Building Insolation and Shadow.

The purpose of this method and its underlying algorithm is to verify that a new building is located so that it will not cast shadows on existing buildings during business hours. This and other questions dealing with sunlight and shadows can be determined from the apparent motion of the Sun on the solstices, approximately June 22nd and December 22nd. For additional information the reader is directed to Reid-Green (1996a), which is hereby incorporated herein.

A Computer Method for Verification of Wheelchair Accessibility in an Office.

The purpose of this method and its underlying algorithm is to verify that the design of an office is such that a wheelchair user can move around in it. Specifically, it must be possible for the wheelchair to have a free path to the telephone, computer terminal, etc., and it must be possible to turn the wheelchair around. For additional information as to one embodiment of such a computer method, the reader is directed to Reid-Green (1996b), which is hereby incorporated herein.

DETAILED DESCRIPTION OF ONE PREFERRED EMBODIMENT: THE ACCESSIBILITY—TOILET ROOM VIGNETTE

Description of a Vignette

The Accessibility—Toilet Room Vignette is set as a design development problem that assesses a candidate's ability to plan one or more accessible toilet rooms within the context of a given area. The exercise tests the candidate's ability to apply design logic and meet the requirements of a simple program, as well as to interpret accessibility code requirements in the development of space plans.

The candidate is given the floor plan of an undeveloped area along with adjacent corridor(s) in the building where one to three toilet rooms are to be located. The footprint of this area is of a predetermined size and configuration. The provided program includes fixture requirements as well as a clear indication of expected functional performance with respect to view screening. The menu of physical objects to be selected, manipulated, and placed using icons provided includes plumbing fixtures, accessories, wall elements with which to construct the plan, and door-swing symbols.

The candidate must design the space or spaces as required and place all walls, fixtures, accessories, and doors necessary to complete the floor plan.

Scoring of Vignette

The candidate's solution is analyzed for completeness, accuracy, and compliance with code and program requirements.

Required Materials for Vignette a) Scenario for the vignette.

b) Statement of program objectives including functional, fixture, and screening requirements along with all other pertinent background information.

c) Code requirements and restrictions as applicable.

d) Floor plan of pre-configured area to be developed showing its relationship to the adjacent corridor(s). Outside walls of corridors should be indicated by double solid lines.

e) Graphic tools for drawing walls, fixtures, accessories, and doors.

Authoring Requirements of Vignette a) The program space to be developed should be between 320 and 430 square feet [30–40 m$^2$], reasonably confined, but sufficient to allow for multiple correct solutions (square footprints permit the greatest variety). This space should be indicated by double dashed lines on the floor plan.

b) One to two sides of the program area must be adjacent to a corridor along their full length.

c) Program area should be adequate for inclusion of fixtures and accessories required by program and code.

d) Required fixtures and accessories must include a total of 1–2 accessible showers or an infant changing tables.

e) 9 to 12 plumbing fixtures should be required.

f) One to three toilet rooms should be required, and at least one of the toilet rooms should be an accessible toilet room.

g) View screening should be required.

h) All measurements should be in multiples of 2 inches [50 mm] and the plan should be on a 2 inch [50 mm] grid.

Technical Overview

Authoring: See sample authoring file entitled "SAMPLE AUTHORING FILE FOR ACCESSIBILITY-TOILET VIGNETTE" in the Source Code Appendix, which contains delivery information, but no scoring information.

Smart Delivery: All room labels should be used before the candidate is permitted to leave the vignette.

Interface: Draw The candidate must both draw and place elements in this vignette.

Elements Which Are to Be Drawn or Placed.

4" Wall (called 100 mm wall in metric vignettes)
8" Wall (called 200 mm wall in metric vignettes)
Doors
Grab Bar
Lavatory
Handicapped Lavatory
Room Labels
Shower (or bidet, depending on script)
Stall
Urinal
Handicapped Urinal
Water Closet
Handicapped Water Closet
Breakdown of Each Element.

4" Wall
  The 4" wall is drawn in the way described in FIG. 42.
8" Wall
  Same as for 4" Wall above and in FIG. 42, only wider.
Doors
  All possible orientations and swings should be available. A secondary pop up should allow selection of widths from 20 to 48 inches, in 4 inch increments. Allow an unlimited number to be drawn.
Grab Bar
  Grab bars should be .dwg objects, 3'6" in length, with wall connectors. The rotate icon will rotate grab bars 90 degrees at a time to the desired orientation. Allow an unlimited number to be drawn.
Lavatory and Handicapped Lavatory
  Both are .dwg objects. The rotate icon will rotate the lavatory 90 degrees at a time to the desired orientation. Allow an unlimited number to be drawn.
Room Labels
  This option will allow the candidate to place a literal from a pop up menu to each created toilet room. If possible, the actual literal should be visible when animated into position. Allow only one of each to be placed.
Shower
  Shower is a .dwg object. The rotate icon will rotate the shower 90 degrees at a time to the desired orientation. Allow an unlimited number to be drawn.
Bidet
  Bidet is a .dwg object. The rotate icon will rotate the bidet 90 degrees at a time to the desired orientation. Allow an unlimited number to be drawn.
Stall
  Stall is a rubberbanding double walled box with 1" between the walls at all magnifications. When doors are placed on a stall, they should cause a break in the wall. When the wall of a stall overlaps an existing or drawn wall, the stall wall should disappear. Allow an unlimited number to be drawn.
Urinal and Handicapped Urinal
  Both are .dwg objects. The rotate icon will rotate the urinal 90 degrees at a time to the desired orientation. Allow an unlimited number to be drawn.
Water Closet and Handicapped Water Closet
  Both are .dwg objects. The rotate icon will rotate the water closet 90 degrees at a time to the desired orientation. Allow an unlimited number to be drawn.
Move/Adjust
  The move icon will allow the candidate to move any .dwg objects, or move or adjust any drawn objects (like stalls, walls).
  As stalls are drawn orthogonal boxes, the candidate should be able to grab any wall and drag.
  Walls have a fixed width, so only the length should be adjustable.
Move Group
  To work as usual: objects are selected individually, moved as a group.
Rotate
  To rotate .dwg objects 90 degrees.
Icons
  The standard set of icons common to all vignettes should appear as well, see FIGS. 2–10, 43–49, 52–53, 63–66.
Grid Snap 2 inches.

ACCESSIBILITY—TOILET ROOM FEATURES

Certain of the Accessibility—Toilet Room Vignette problem features were discussed in the earlier section entitled Solution Scoring System. A detailed discussion of the features for one preferred embodiment of the present invention follows below.

FIGS. 35–41 show the Master Features Matrix and feature cluster matrices for one preferred embodiment of the Accessibility-Toilet Room Vignette.

ANOTHER PREFERRED EMBODIMENT THE HYPOTHETICAL BATHROOM REMODEL VIGNETTE

Scenario.

The candidate is instructed to re-design a master bathroom starting with a pregutted floor plan; using the drawing tools provided and using all the fixtures, cabinets and lighting given in the program. See FIG. 68.

Program.

On the given floor plan the candidate is instructed to place the following cabinets, fixtures and accessories:

1. 60"×30" Bathtub;
2. Toilet;
3. 30" wide×18" deep freestanding linen cabinet;
4. 42" inch wide×18" deep Vanity Cabinet;
5. Sink;
6. 3 recessed incandescent ceiling Lighting Fixtures; and
7. Fuzzy Rug and Toilet Seat Cover.

Scoring.

The scoring tree or feature evaluation map used to evaluate the solutions is shown in FIG. 67. The first branch or cluster from the left (M2) comprises features relating to the plumbing fixtures to be located in the remodeled bathroom. The second and third clusters (M3 and M4) comprise features relating to the placement of accessories and cabinets, respectfully. Those features relating to the location of lights are evaluated in the fourth cluster (M5). The fifth cluster (M6) comprises features relating to the completeness of the solution. Located below the Fixtures cluster (M2) are three subclusters labeled Toilet (M7), Lavatory (M8) and Bathtub (M9). Below each of these three subclusters are several features which must be scored first in order to subsequently determine a score for the subcluster.

As noted earlier, scoring procedure employs a system of three ordered categories. These categories correspond to the insertion of an intermediate, or indeterminate, category (I) between the clearly acceptable (A) and the clearly unacceptable (U). Hence, a designation of "A" indicates the demonstration of an acceptable level of ability; "I" indicates a level of ability that is neither clearly acceptable nor clearly unacceptable; and "U" indicates an unacceptable level of ability.

The first feature (F1) below the Toilet subcluster (M7) evaluates whether or not the back of the toilet is located adjacent to a plumbing wall. In so doing, the scoring system searches the solution for a toilet. If one is found, the system determines whether or not its back is within an acceptable distance from a plumbing wall (with a stack vent indicated). If the back is either between 3" and 6" away or up to 1" into the wall, an "I" is assigned.

The feature is assigned a "U" if the condition is other than those formerly described. In a first hypothetical solution (FIG. 69), the back of the toilet is placed on the face of the wall in which an existing vent stack is indicated. Thus, the scoring system assigns an "A" to this feature.

In a second hypothetical solution (FIG. 70), the back of the toilet is located adjacent to a wall with no vent stack indicated. As a result, a "U" is assigned to the feature in this case. It is important to note that the thresholds and tolerances for each feature in a vignette's scoring tree are derived and refined iteratively through expert judgment (i.e. the judgment of architect practitioners and educators with considerable knowledge and experience in examination scoring procedures).

Factors such as screen resolution and grid snap values, as well as possible variations in expert opinion, are typical considerations in determining these values.

The second feature (F2) below cluster M7 checks the distance between the centerline of the toilet and a wall or any obstruction to either side. If the nearest face of a wall, fixture or cabinet is a perpendicular distance of 15" or more from the centerline of the toilet, an "A" is assigned to this feature. If the nearest face is between 14" and 15" from the centerline, an "I" is assigned. Any condition closer than 14" is assigned a "U".

If we assume that FIG. 69 shows a toilet located so that its centerline is 18" from both the nearest wall on one side and the end of the vanity on the other. This feature, therefore, satisfies the condition for an "A". Likewise. Assume, that Solution B also satisfies the condition for an "A".

The third feature (F3) below cluster M7 checks for the required clearance on front of the toilet. This feature might be used to illustrate the occasional instance where an indeterminate category is considered inappropriate or unnecessary by experts. In this case, an "A" is assigned if the nearest face of a wall, fixture or cabinet is a perpendicular distance of 29" or more in front of the toilet. Any condition closer than 29" is assigned a "U". In this case, therefore, there are only two possible scores which can be assigned "A" or "U", that is, there is no "I" score. Again, assume Solution A is assigned an "A", and Solution B is assigned a "U" for this condition.

The three features scored above are the primitives of subcluster M7. All of the primitives below each subcluster or cluster are evaluated in a similar fashion, each having its own set of scoring rules to determine the appropriate thresholds and tolerances. The result is an assignment of a score category (A, I or U) for each individual primitive.

The next step in the scoring process is to combine the scores assigned to the primitives with each other to generate a score category for their respective subcluster or cluster. In order to do this, a weighting value must be assigned to each of the previously scored features for the purpose of defining the importance of each feature in relation to the others within the same cluster or subcluster. In the example discussed above, the features comprising subcluster M7 (F1, F2 and F3), must be weighted in relation to each other before they can be combined to produce a score for subcluster M7.

According to the scoring tree (FIG. 67), the experts have determined that feature F3 (Front Clearance) is more important that features F1 and F2. As a result, feature F3 is double counted, or given a weighting value of two (2), against a value of one (1) each for features F1 and F2.

The possibility of three (3) score values (A, I or U) each for features F1 and F2 and two (2) score values (A or U) for feature F3 results in a range of 18 possible combinations, each of which results in a score category for subcluster M7. Each combination can be summarized by the counts of any two of the three possible values. Therefore, all possible combinations of "U"s and "I"s are plotted on a two dimensional matrix, where the rows refer to the number of "I"s and the columns refer to the number of "U"s. See FIG. 67 (M7). Each cell in this matrix is associated with a score for subcluster M7. Since FIG. 69 A was assigned an "A" for all three features (F1, F2 and F3), it is assigned a "A" in subcluster M7 (zero "I"s, zero "U"s). FIG. 70 was assigned a "U" for feature F1, an "A" for feature F2 and a "U" for feature F3, resulting in a count of three (3) "U"s, zero "I"s and one "A". According to FIG. 67 (M7), this results in a score of "U" for subcluster M7 in the case of Solution B.

Subclusters M8 and M9 must be processed, along with the features that feed into them, in a manner similar to M7, after which, the scores assigned to the three subclusters (M7, M8 and M9) are combined in a matrix to produce a score for cluster M2. A process identical in nature to that described in the preceding discussion is executed at each cluster (M3, M4, M5 and M6) in the scoring tree/evaluation map. Finally the six scored clusters are combined, with appropriate weighting values, in the vignette's master matrix to produce a score (A, I or U) for the vignette.

Fixtures Cluster (M7, M8 and M9).

Both types of nodes, features and clusters scores, can take on three values: A, I, or U. In the case of the Fixtures cluster (see FIG. 67), which is composed of three lower-level features (Toilet, Lavatory and Bathtub), there are 27 (3×3×3) different possible "input" feature values; these are partially enumerated in Table 1 below. Each such outcome can be summarized by the counts of any two of the three possible values. The U's and I's have been used as the summary of an outcome measure as seen in the last two columns of Table 1. All possible values for a cluster can be represented by a two-dimensional matrix where the rows refer to the number of I's and the columns refer to the number of U's.

TABLE 1

Enumeration of Feature Values Corresponding to Toilet, Lavatory and Bathtub Clusters

| Feature Value Sets | Fixture Cluster | | | Counts | |
|---|---|---|---|---|---|
| | Toilet | Lavatory | Bathtub | U | I |
| 1. | A | A | A | 0 | 0 |
| 2. | I | A | A | 0 | 1 |
| 3. | A | I | A | 0 | 1 |
| 4. | A | A | I | 0 | 1 |
| 5. | I | I | A | 0 | 2 |
| 6. | I | A | I | 0 | 2 |
| 7. | A | I | I | 0 | 2 |
| 8. | I | I | I | 0 | 3 |
| 9. | U | A | A | 1 | 0 |
| 10. | A | U | A | 1 | 0 |
| 11. | I | U | I | 2 | 2 |
| 12. | U | I | I | 1 | 2 |
| . | . | . | . | . | . |
| . | . | . | . | . | . |
| . | . | . | . | . | . |
| 27. | U | U | U | 3 | 0 |

Table 2, below, is a possible matrix for the Fixture cluster. According to this matrix, an "A" corresponds to feature value set #1 with zero I's and Zero U's (e.g. the feature value set #1 in Table 1). An "I" corresponds to feature value set number with one I and zero U's (e.g., feature sets #2, #3, and #4 in Table 1.) All other feature value sets get assigned a U.

TABLE 2

Summary Matrix for Fixture Cluster

| | | U's | | |
|---|---|---|---|---|
| | | 0 | 1 | 2 |
| I's | 0 | A | U | U |
| | 1 | I | U | U |
| | 2 | U | U | U |
| | 3 | U | U | U |

Although preferred embodiments of the present invention have been described above in detail, it is desired to emphasize that this has been for the purpose of illustrating and describing the invention, and should not be considered as necessarily limiting the invention, it being understood that many modifications can be made by those skilled in the art while still practicing the invention claim herein.

SOFTWARE FILE STRUCTURE

.m13 files.

Contain the reference information for the particular vignette. The files comprise the text and graphics for those portion of the index screen (see, for example, FIG. INDEX SCREEN), which include the following task information topics: "Vignette Directions"; "Program"; "Tips"; and "Review of the General Test Directions". These files are referenced by the corresponding .aut file.

Several vignette specific references are included in one preferred embodiment of the present invention as well. These include lighting diagrams, building elevations, building sections and tree diagrams.

.aut files.

Reference the files required by the corresponding delivery and scoring programs, and contain all non-graphical information required by delivery and scoring. For example, they contain specific feature values and criterion used by scoring.

.dwg files.

AutoCAD objects such as the following, which appear in one preferred embodiment of the present invention, namely: the lavatory, shower, bidet, water closet, etc. The drawings provide all graphical information required by the delivery and scoring programs.

.mtx files.

Matrix files provide tuples and weights required to allow scoring programs to translate feature scores into an overall score for the vignette. They contain information on the weights of features and which features feed into which matrixes and which squares of matrix are possible and what the cut-offs are.

.dll files.

Dynamic link libraries provide by third party software vendors (Borland, AutoCAD) and written internally that contain core functionality required by all delivery and scoring programs.

.log files.

Contain the candidates' "scores". They also contain verbose information about conditions encountered while scoring a particular solution that allow for validation that the scoring program is working correctly.

REFERENCES

Bejar, I. J. "*From Adaptive Testing to Automated Scoring of Architectural Simulations*" in El Mancall & PG Bashook (Eds.), pp. 115–127: Assessing Clinical Reasoning: *The*

*Oral Examination and Alternative Methods.* Evanston, Ill., American Board of Medical Specialties, 1995.

NCARB, "How Vignettes are Scored" (National Council of Architectural Registration Boards, Wash. D.C. October 1994).

Reid-Green, K. (1996a). "Insolation and Shadow." Research Report (RR-96-18), Educational Testing Service, Princeton, N.J.

Reid-Green, K. (1996b). "A Computer Method for Verification of Wheelchair Accessibility in an Office." Research Memorandum (RM-96-1), Educational Testing Service, Princeton, N.J.

Reid-Green, K. (1996c). "An Algorithm for Calculating Setback Polygons." Educational Testing Service, Princeton, N.J.

Reid-Green, K. (1996d). "An Algorithm For Determining If an Object Can Be Viewed From Another Object." Educational Testing Service, Princeton, N.J.

We claim:

1. A computerized system for the professional assessment of architects, civil engineers, aeronautical engineers, mechanical engineers, naval engineers, interior designers, landscape designers, and architectural designers, by the creation, presentation to a test candidate, and scoring of a test item in the form of a computer-based simulation of professional practice, wherein the system comprises:
   an authoring subsystem for creating a computer-based simulation of professional practice test item;
   a delivery subsystem which assembles the test item for the test candidate, presents the test item to the test candidate, provides computerized tools to the test candidate for use in solving the test item, and stores the solution; and
   a scoring subsystem which decomposes, analyzes and scores the solution.

2. The computerized system of claim 1 wherein the authoring subsystem comprises means for creating and establishing scoring rules and criteria for test items.

3. The computerized system of claim 2 wherein the authoring subsystem further comprises means for specifying the names and attributes of spaces that will comprise a unique script.

4. The computerized system of claim 1 wherein the delivery subsystem comprises means for assembling a complete test item for a test candidate based on instructions stored in an authoring file.

5. The computerized system of claim 4 wherein said instructions direct the delivery subsystem:
   to reference various files stored in multiple formats and locations; and
   how to present certain features, options, menus, and drawing elements to a test candidate.

6. The computerized system of claim 1 wherein the authoring subsystem comprises FRAMEWORK software which has been compiled as a dynamic link library.

7. The computerized system of claim 6 wherein the dynamic link library includes a library of computer code representing geometric objects.

8. The computerized system of claim 6 wherein the dynamic link library is comprised of the following kinds of files: COMPONENT files; CONTROL files; DWG files; EVENTS files; FEATURES files; GEOMETRY files; GRAPHICS files; HDR files; MOUSETRK files; OBJS files; OSA files; OSACALC files; PERSTGEO files; APPLICAT files; SCORING files; TRANSACT files; VGNOBJEC files; VGNTASKS files; VGNWIND files; and WINDOWS files.

9. The computerized system of claim 1 wherein the delivery subsystem of the present invention interfaces with a test administration system.

10. The computerized system of claim 9 wherein the test administration system is Open System Architecture (OSA).

11. The computerized system of claim 1 wherein the scoring subsystem comprises:
    means for decomposing a test candidate's solution; and
    means for analyzing said solution.

12. The computerized system of claim 1 wherein the assessment comprises vignette test items directed to building design problems.

13. The computerized system of claim 12 wherein the test item comprises a site section vignette.

14. The computerized system of claim 13 further comprising an index screen.

15. The computerized system of claim 13 further comprising an vignette directions screen.

16. The computerized system of claim 13 further comprising an program screen.

17. The computerized system of claim 13 further comprising a tips screen.

18. The computerized system of claim 13 further comprising a general test directions screen.

19. The computerized system of claim 12 wherein the test item comprises a site analysis vignette.

20. The computerized system of claim 12 wherein the test item comprises a site grading vignette.

21. The computerized system of claim 20 further comprising a vignette directions screen.

22. The computerized system of claim 20 further comprising a program directions screen.

23. The computerized system of claim 20 further comprising a tips screen.

24. The computerized system of claim 20 further comprising a scoring decision tree.

25. The computerized system of claim 20 further comprising features scoring.

26. The computerized system of claim 25 further comprising a scoring decision tree.

27. The computerized system of claim 25 further comprising features scoring.

28. The computerized system of claim 25 further comprising a master features matrix.

29. The computerized system of claim 20 further comprising a features matrix.

30. The computerized system of claim 20 further comprising site grading vignette solution source code.

31. The computerized system of claim 12 wherein the test item comprises a zoning section vignette.

32. The computerized system of claim 31 further comprising the feature matrices.

33. The computerized system of claim 12 wherein the test item comprises a site parking vignette.

34. The computerized system of claim 12 wherein the test item comprises a site design vignette.

35. The computerized system of claim 1 wherein the assessment comprises vignette test items directed to site design problems.

36. The computerized system of claim 35 wherein the test item comprises a schematic design vignette.

37. The computerized system of claim 35 wherein the test item comprises a schematic structural design vignette.

38. The computerized system of claim 35 wherein the test item comprises a mechanical and electrical plan vignette.

39. The computerized system of claim 35 wherein the test item comprises a building section vignette.

40. The computerized system of claim 35 wherein the test item comprises a accessibility—ramp vignette.

41. The computerized system of claim 35 wherein the test item comprises a accessibility—toilet room vignette.

42. The computerized system of claim 41 further comprising Sample Authoring File for Accessibility-Toilet Vignette source code.

43. The computerized system of claim 35 wherein the test item comprises a stair design vignette.

44. The computerized system of claim 35 wherein the test item comprises a roof plan vignette.

45. The computerized system of claim 35 wherein the test item comprises an interior layout vignette.

46. A computerized method for the assessment of architects by the creation, presentation to a test taker, and scoring of a test item in the form of a computer-based simulation of architectural practice, comprising the steps of:
   authoring a test item in the form of a computer-based simulation of architectural practice using a dynamic link library comprising geometric objects;
   delivering the test item to a test taker and providing the test taker with the tools necessary to provide a response to the test item; and
   scoring the test taker's response by using a hierarchical organization of problem features needed to characterize performance and decomposing the test taker's response.

47. The computerized method of claim 46 wherein the tools provided to the test taker are comprised of common and unique tools.

48. The computerized method of claim 47 wherein the common tools further comprise: SKETCH icon tools; ORTHO icon tool; ZOOM icon tool; CURSOR icon tool; UNDO icon tool; ERASE icon tool; ID icon tool; CALC icon tool; TASK INFO icon tool; START OVER icon tool; and a REVIEW icon tool.

49. The computerized method of claim 47 wherein the unique tools further comprise: CHECK OVERLAPS icon tools; DRAW icon tool; MOVE ADJUST icon tool; MOVE GROUP icon tool; ROTATE icon tool; LAYERS icon tool; OPTIONS icon tool; and a SET ROOF icon tool.

50. The computerized method of claim 47 wherein the step of scoring the test taker's response comprises:
   feature extraction; and
   matrix calculation.

51. The computerized method of claim 50 wherein feature extraction comprises:
   reading feature requirements from an authoring file;
   comparing the requirements against data in a test taker's solution file; and
   determining a score of Acceptable (A), Indetermined (I) or Unaccceptable (U) for each feature.

52. The computerized method of claim 50 wherein feature extraction comprises:
   reading feature requirements from an authoring file;
   comparing the requirements against data in a test taker's solution file; and
   determining a score of Acceptable (A), Indeterminate (I), Unacceptable (U) or Fatal (F) for each feature.

53. The computerized method of claim 50 wherein matrix calculation comprises:
   assigning each feature to a sub-matrix;
   assigning a weight to each feature in a sub-matrix;
   scoring the sub-matrix as either Acceptable (A), Indeterminate (I) or Unacceptable (U); by associating a cut score with the matrix which determines how many scores of an appropriately weighted feature scores of either (I) or (U) the matrix can have before the matrix is to be scored as an (I) or (U);
   assigning, as applicable, each sub-matrix and its score to a sub-matrix or second sub-matrix which second matrix comprises feature scores and other sub-matrix scores;
   assigning a weight to each feature and sub-matrix in a matrix;
   scoring the matrix as either (A), (I) or (U) by associating a cut score with the matrix which determines how many scores of an appropriately weighted feature scores or sub-matrix scores of either (I) or (U) the matrix can have before the matrix is to be scored as an (I) or (U); and
   continuing the above steps until all features and sub-matrices have been scored and a final overall score determined.

* * * * *

UNITED STATES PATENT AND TRADEMARK OFFICE
CERTIFICATE OF CORRECTION

PATENT NO.   : 6,056,556
DATED        : May 2, 2000
INVENTOR(S)  : Henry I. Braun et al.

It is certified that error appears in the above-identified patent and that said Letters Patent is hereby corrected as shown below:

Title page,
Insert after "53 Claims, 70 Drawing Sheets" the following.
-- (4 Microfiche, 342 Frames) --

Column 4,
Line 13, before the BACKGROUND OF THE INVENTION, please add the following,
-- MICHROFICHE APPENDIX
    This patent document includes a computer program listing in the form of a Microfiche Appendix consisting of 4 microfiche with a total of 342 frames. --
    Please cancel all references to "Source Code Appendix" and in its place substitute -- Microfiche Appendix --.

Column 2,
Line 65, cancel "Source Code Appendix" and in its place insert -- Microfiche Appendix --.

Column 10,
Lines 38-39, cancel "Source Code Appendix" and in its place insert -- Microfiche Appendix --.

Column 20,
Lines 48-49, cancel "Source Code Appendix" and in its place insert -- Microfiche Appendix --.

Column 21,
Line 26, cancel "Source Code Appendix" and in its place insert -- Microfiche Appendix --.

Column 21,
Line 33, cancel "Source Code Appendix" and in its place insert -- Microfiche Appendix --.
Line 55, cancel "Source Code Appendix" and in its place insert -- Microfiche Appendix --.

UNITED STATES PATENT AND TRADEMARK OFFICE
CERTIFICATE OF CORRECTION

PATENT NO.   : 6,056,556
DATED        : May 2, 2000
INVENTOR(S)  : Henry I. Braun et al.

It is certified that error appears in the above-identified patent and that said Letters Patent is hereby corrected as shown below:

Column 22,
Line 12, cancel "Source Code Appendix" and in its place insert -- Microfiche Appendix --.

Column 23,
Line 47, cancel "Source Code Appendix" and in its place insert -- Microfiche Appendix --.

Signed and Sealed this

Fifth Day of March, 2002

Attest:

Attesting Officer

JAMES E. ROGAN
*Director of the United States Patent and Trademark Office*